(12) United States Patent
Zhu et al.

(10) Patent No.: US 12,047,528 B2
(45) Date of Patent: *Jul. 23, 2024

(54) FAVORITE-OBJECT DISPLAY METHOD AND TERMINAL

(71) Applicant: HUAWEI TECHNOLOGIES CO., LTD., Shenzhen (CN)

(72) Inventors: Zhenhua Zhu, Nanjing (CN); Lan Mo, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,577

(22) Filed: Feb. 7, 2023

(65) Prior Publication Data

US 2023/0300241 A1 Sep. 21, 2023

Related U.S. Application Data

(63) Continuation of application No. 17/369,062, filed on Jul. 7, 2021, now Pat. No. 11,606,458, which is a
(Continued)

(30) Foreign Application Priority Data

Feb. 27, 2017 (CN) .......................... 201710109631.0

(51) Int. Cl.
*G06F 3/04817* (2022.01)
*G06F 3/04855* (2022.01)
(Continued)

(52) U.S. Cl.
CPC .... *H04M 1/72472* (2021.01); *G06F 3/04817* (2013.01); *G06F 3/04855* (2013.01); *H04M 1/7243* (2021.01); *H04M 1/72454* (2021.01)

(58) Field of Classification Search
CPC ............... G06F 3/04817; G06F 3/0481; G06F 16/9562; H04M 1/72472
See application file for complete search history.

(56) References Cited

U.S. PATENT DOCUMENTS 6,544,295 B1 4/2003 Bodnar
6,549,217 B1 4/2003 De Greef et al.
(Continued)

FOREIGN PATENT DOCUMENTS

CN 101175172 A 5/2008
CN 101860613 A 10/2010
(Continued)

OTHER PUBLICATIONS

Machine Translation and Abstract of Chinese Publication No. CN101175172, May 7, 2008; 10 pages.
(Continued)

*Primary Examiner* — Nicholas Klicos
(74) *Attorney, Agent, or Firm* — Rimon PC

(57) ABSTRACT

Embodiments of this application provide a favorite-object display method, to manage favorite objects in different applications, and after an input operation performed by a user on a favorite object is received, display, in an original application, content corresponding to the favorite object. The method includes: displaying a favorites management interface, where a first favorite object and a second favorite object are displayed on the favorites management interface; receiving an operation entered by a user; and if the operation points to the first favorite object, responding to the operation to display, in a first application, content corresponding to the first favorite object; or if the operation points to the second favorite object, responding to the operation to display, in a second application, content corresponding to the second favorite object.

30 Claims, 38 Drawing Sheets

Related U.S. Application Data continuation of application No. 16/488,977, filed as application No. PCT/CN2017/104951 on Sep. 30, 2017, now Pat. No. 11,076,042.

(51) Int. Cl.
*H04M 1/7243* (2021.01)
*H04M 1/72454* (2021.01)
*H04M 1/72472* (2021.01)

(56) References Cited

U.S. PATENT DOCUMENTS

| | | | |
|---|---|---|---|
| 7,793,232 B2 * | 9/2010 | Chaudhri | G06F 3/0481 |
| | | | 715/767 |
| 8,527,883 B2 * | 9/2013 | Sullivan | G06F 16/9562 |
| | | | 715/205 |
| 8,793,575 B1 * | 7/2014 | Lattyak | G06F 40/131 |
| | | | 715/273 |
| 9,310,958 B2 * | 4/2016 | Kluttz | G06F 3/04817 |
| 9,459,769 B1 * | 10/2016 | DeLuca | H04L 67/02 |
| 2006/0026534 A1 | 2/2006 | Ruthfield et al. | |
| 2006/0123353 A1 | 6/2006 | Matthews et al. | |
| 2008/0235602 A1 | 9/2008 | Strauss et al. | |
| 2008/0307335 A1 | 12/2008 | Chaudhri et al. | |
| 2009/0158212 A1 | 6/2009 | Dykstra-Erickson et al. | |
| 2009/0163251 A1 | 6/2009 | Decugis | |
| 2009/0199106 A1 * | 8/2009 | Jonsson | G06F 16/9562 |
| | | | 715/744 |
| 2011/0087982 A1 * | 4/2011 | McCann | G06F 3/0486 |
| | | | 715/788 |
| 2011/0289427 A1 | 11/2011 | Toprani | |
| 2012/0066630 A1 | 3/2012 | Kim et al. | |
| 2014/0195926 A1 | 7/2014 | Hussain | |
| 2014/0237419 A1 | 8/2014 | Ryu | |
| 2014/0258914 A1 | 9/2014 | Mir et al. | |
| 2014/0327629 A1 * | 11/2014 | Jobs | G06F 3/0488 |
| | | | 345/173 |
| 2015/0193117 A1 | 7/2015 | Nicolaou et al. | |
| 2015/0293691 A1 | 10/2015 | Son et al. | |
| 2017/0010771 A1 | 1/2017 | Bernstein et al. | |
| 2017/0052994 A1 | 2/2017 | Jain et al. | |

FOREIGN PATENT DOCUMENTS

| | | | |
|---|---|---|---|
| CN | 102404443 A | 4/2012 | |
| CN | 102508597 A | 6/2012 | |
| CN | 102663064 A | 9/2012 | |
| CN | 103678502 A | 3/2014 | |
| CN | 104123316 A | 10/2014 | |
| CN | 104125264 A | 10/2014 | |
| CN | 104156397 A | 11/2014 | |
| CN | 104376075 A | 2/2015 | |
| CN | 104571870 A | 4/2015 | |
| CN | 105872208 A | 8/2016 | |
| CN | 106202223 A | 12/2016 | |
| CN | 106293705 A | 1/2017 | |

OTHER PUBLICATIONS

Machine Translation and Abstract of Chinese Publication No. CN101860613, Oct. 13, 2010; 4 pages.
Machine Translation and Abstract of Chinese Publication No. CN102508597, Jun. 20, 2012; 18 pages.
Machine Translation and Abstract of Chinese Publication No. CN102663064, Sep. 12, 2012; 24 pages.
Machine Translation and Abstract of Chinese Publication No. CN103678502, Mar. 26, 2014; 24 pages.
Machine Translation and Abstract of Chinese Publication No. CN104376075, Feb. 25, 2015; 24 pages.
Machine Translation and Abstract of Chinese Publication No. CN106202223, Dec. 7, 2016; 18 pages.
Foreign Communication From A Counterpart Application, PCT Application No. CN2017/104951, English Translation of International Search Report, dated Jan. 3, 2018; 2 pages.
Foreign Communication From A Counterpart Application, PCT Application No. CN2017/104951, English Translation of Written Opinion, dated Jan. 3, 2018; 5 pages.

* cited by examiner

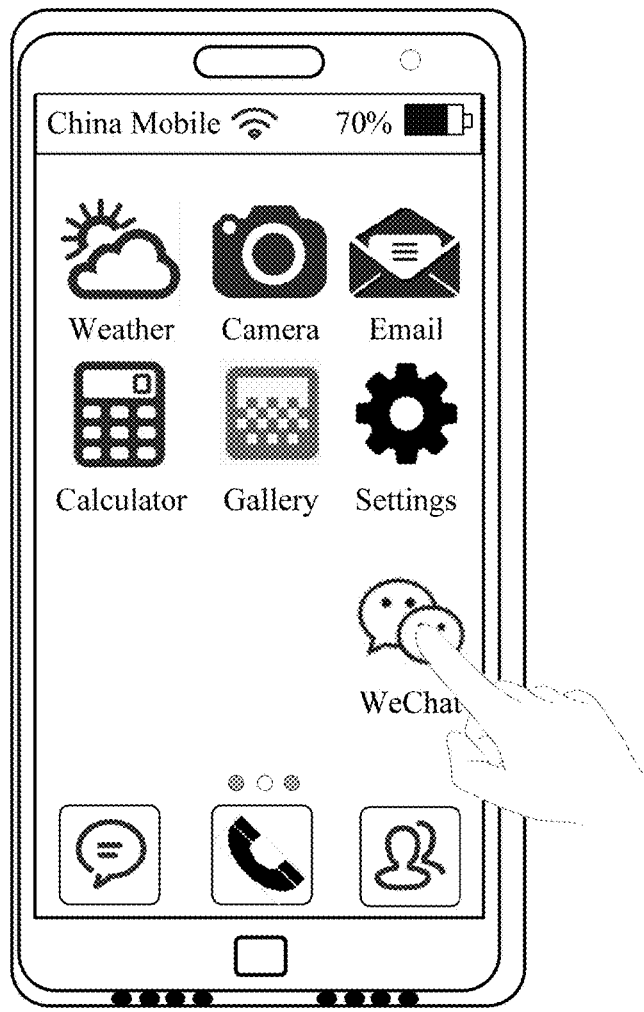
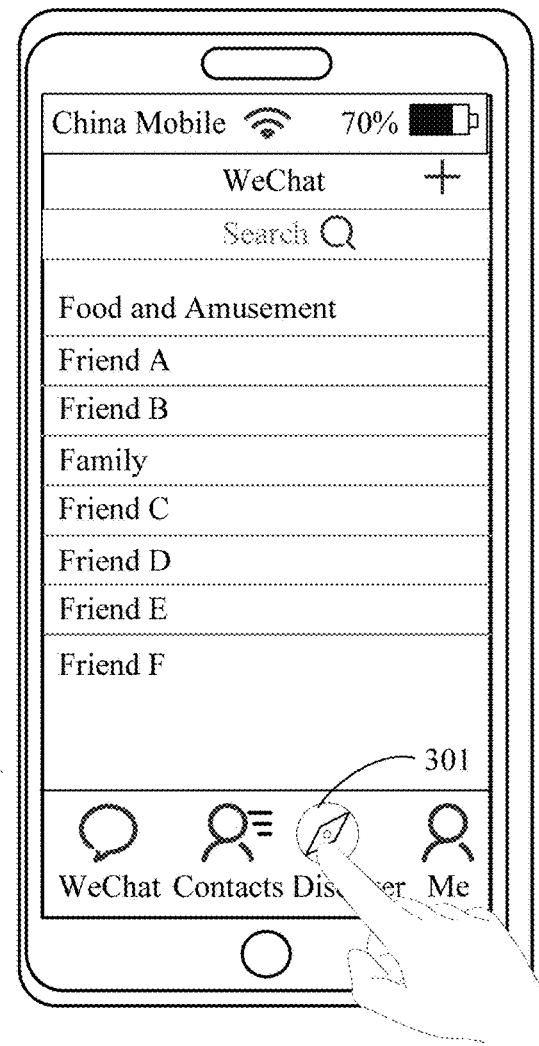
FIG. 3A                    FIG. 3B

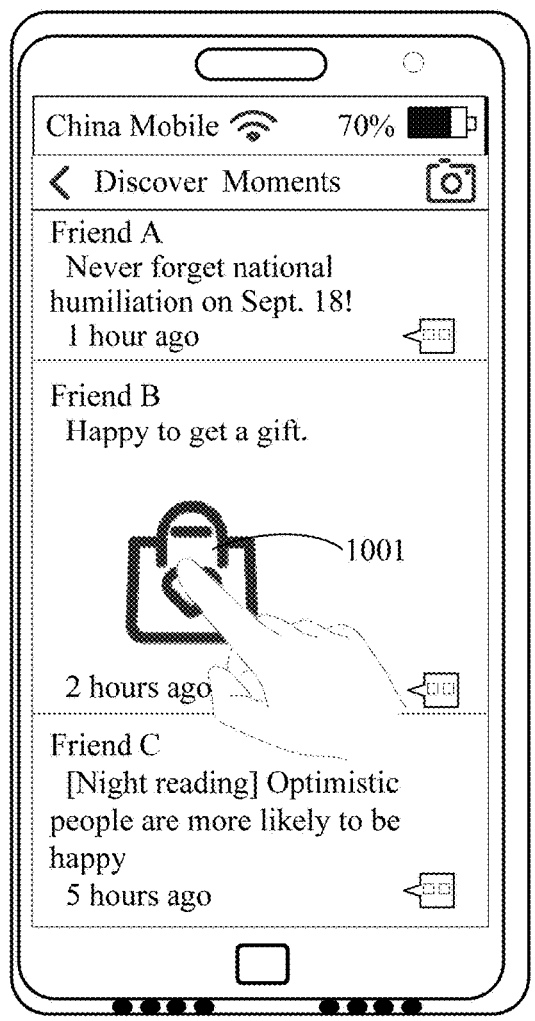
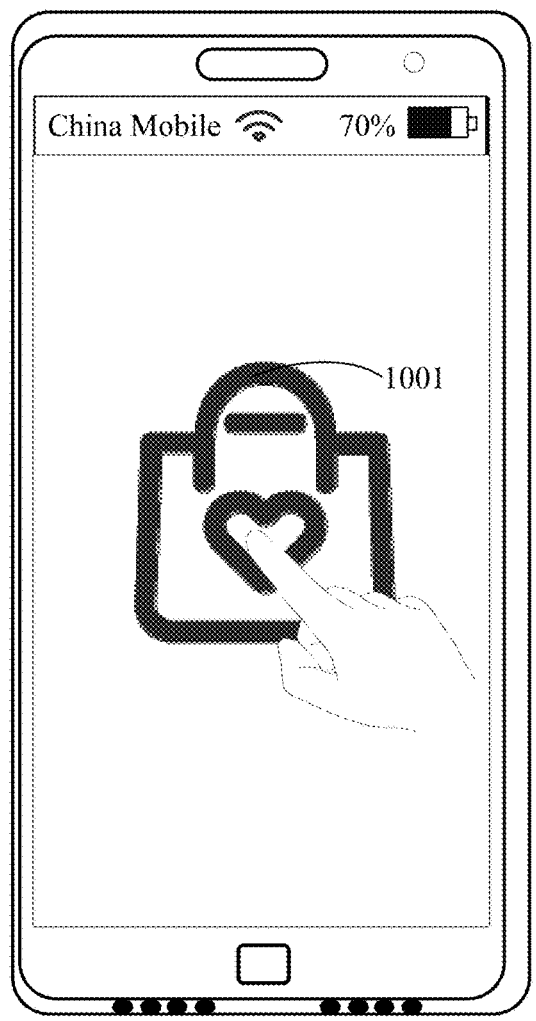
FIG. 10A
FIG. 10B

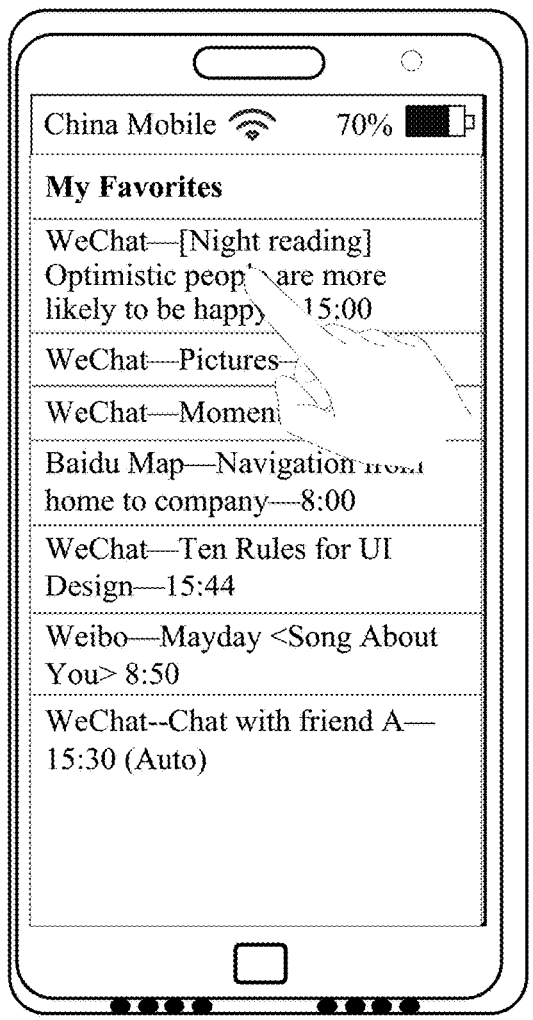
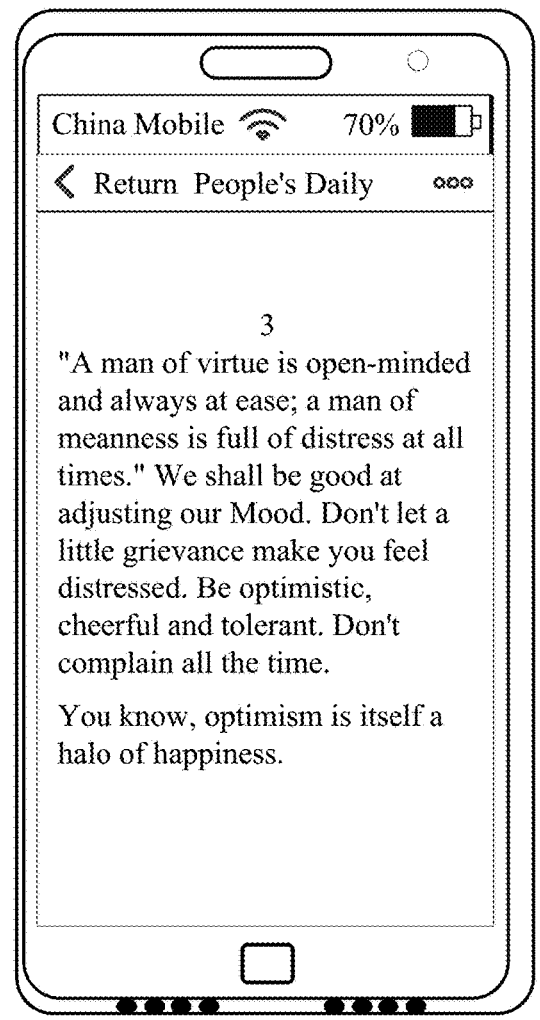
FIG. 17A                    FIG. 17B

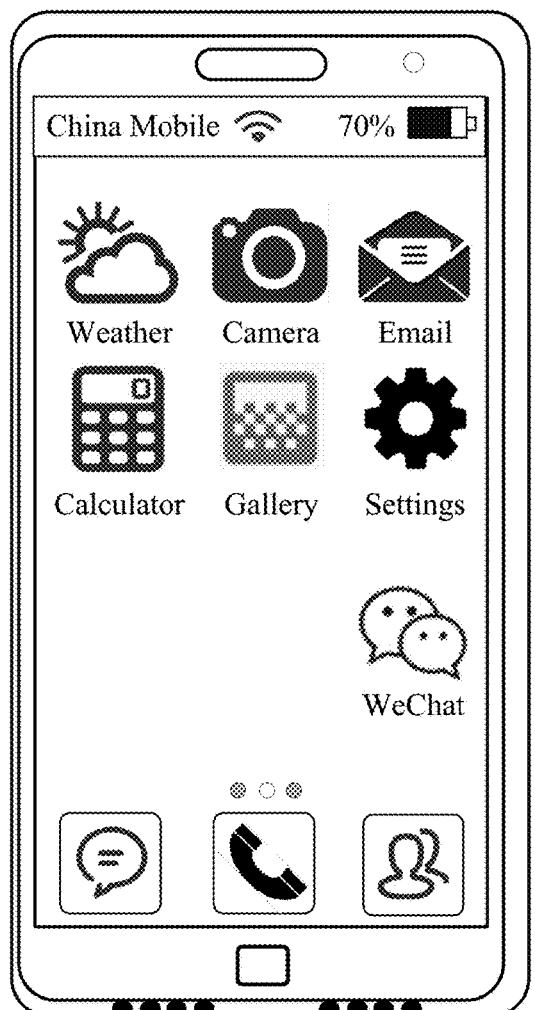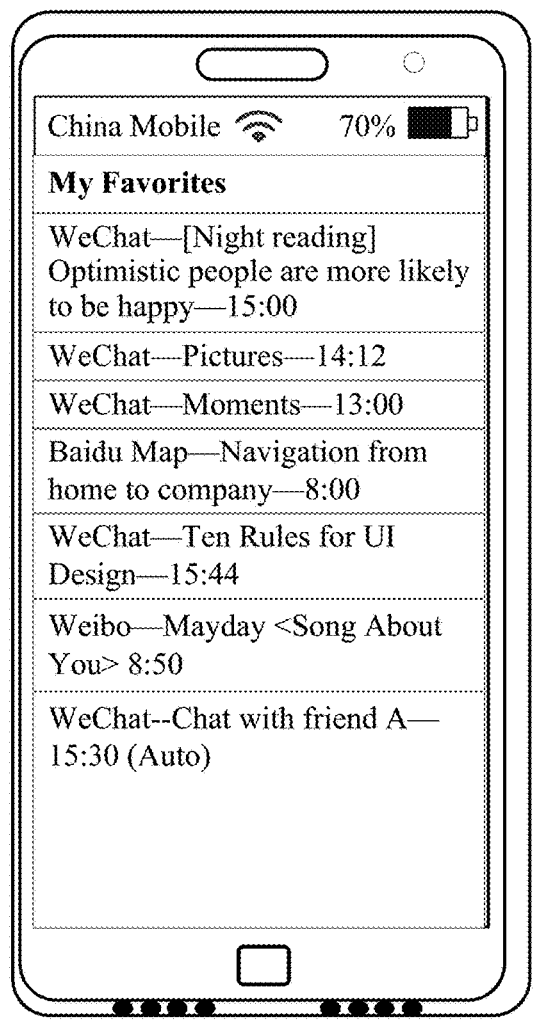
FIG. 24A    2401
FIG. 24B

FAVORITE-OBJECT DISPLAY METHOD AND TERMINAL

CROSS-REFERENCE TO RELATED APPLICATIONS

This application is a continuation of U.S. patent application Ser. No. 17/369,062, filed on Jul. 7, 2021, which is a continuation of U.S. patent application Ser. No. 16/488,977, filed on Aug. 27, 2019, now U.S. Pat. No. 11,076,042, which is a national stage of International Application No. PCT/CN2017/104951, filed on Sep. 30, 2017, which claims priority to Chinese Patent Application No. 201710109631.0, filed on Feb. 27, 2017. All of the aforementioned patent applications are hereby incorporated by reference in their entireties.

TECHNICAL FIELD

Embodiments of this application relate to the field of terminal applications, and in particular, to a favorite-object display method and a terminal.

BACKGROUND

Some applications on a terminal have a favorites function inside, for example, a favorites folder of a browser or Favorites of WeChat Moments. When using an APP, a user can add, to favorites, favorite content that is not completely read due to a time limit, a scene limit, or the like, and continue to view and read the favorite content later.

However, the favorites function is inapplicable to other applications, and is implemented only within the corresponding application, and therefore is not for general use. In addition, to view the favorites, the user needs to start a corresponding application and find a corresponding favorites function. This operation process is relatively complicated.

SUMMARY

Embodiments of this application provide a favorite-object display method and a terminal, to manage favorite objects in different applications, and when a user views favorites, after an input operation performed by a user on a favorite object is received, display, in an original application, content corresponding to the favorite object, thereby improving user experience.

A first aspect of the embodiments of this application provides a favorite-object display method and a terminal. The favorite-object display method may include: currently displaying, by a terminal, a favorites management interface, where a first favorite object and a second favorite object are displayed on the favorites management interface; receiving an operation entered by a user; and if the operation points to the first favorite object, responding to the operation to display, in a first application, content corresponding to the first favorite object; or if the operation points to the second favorite object, responding to the operation to display, in a second application, content corresponding to the second favorite object. The favorites management interface may include various favorite objects. The favorite objects may be presented as "an application name and a file name (for example, an article title, a picture name, a video name, or a music name)", or may be presented as "an application name, a file name (for example, an article title, a picture name, a video name, or a music name), and time", or may be presented in another manner. This is not specifically limited.

The terminal receives the input operation of the user on the favorites management interface, and if the operation points to the first favorite object, the terminal responds to the operation to display, in the first application, the content corresponding to the first favorite object. That is, the content corresponding to the first favorite object is displayed in an original application, improving user experience. In addition, the favorites management interface saves favorite objects in different applications and is for general use.

Optionally, in some embodiments of this application, the first favorite object is added to favorites by using a favorites entrance provided by the first application. It can be understood that the favorites entrance provided by the first application is usually provided by the application itself, and has no system-level permission.

Optionally, in some embodiments of this application, the first favorite object is added to favorites by using a favorites entrance provided by the terminal, and the favorites entrance provided by the terminal is different from the favorites entrance provided by the first application. It can be understood that the favorites entrance provided for the first favorite object by the terminal is a favorites entrance provided by a system, and has system-level permissions.

Optionally, in some embodiments of this application, the method may further include: if the content corresponding to the first favorite object is displayed, restoring, by the terminal, a context status that is at a time when the content corresponding to the first favorite object is added to favorites. That is, if the operation entered by the user points to the first favorite object, the terminal can not only display, in the first application, the content to which the first favorite object point, but also restore the context status of the content to which the first favorite object point. For example, a reading progress of an article is 50% when a user adds the article to favorites; after this article added to favorites, if the article is opened again, the reading progress 50% of this article is displayed, improving user experience.

Optionally, in some embodiments of this application, the method further includes: performing, by the terminal, classified management on the first favorite object and the second favorite object based on an application type; or performing, by the terminal, classified management on the first favorite object and the second favorite object based on a favorites type. It should be noted that the activity content added to favorites by the user may be viewed on a user management interface, and classified management may be automatically performed by the terminal on favorite objects on the user management interface, or classified management may be manually performed by the user on favorite objects on the user management interface, or an operation such as editing or deletion may be performed on the favorite objects.

Optionally, in some embodiments of this application, before the displaying a favorites management interface, the method may further include: receiving, by the terminal, a first gesture entered by the user; and the displaying a favorites management interface may include: if the first gesture matches a preset gesture, displaying, by the terminal, the favorites management interface. This provides a feasible solution for displaying the favorites management interface and diversifies this solution.

Optionally, in some embodiments of this application, the displaying a favorites management interface may include: receiving, by the terminal, an operation of selecting a first favorites icon from a function icon menu by the user, and displaying the favorites management interface. This provides a feasible solution for displaying the favorites management interface and diversifies this solution.

Optionally, in some embodiments of this application, the displaying a favorites management interface may include: receiving, by the terminal, an operation of selecting a second favorites icon under a virtual function button by the user, and displaying the favorites management interface. This provides a feasible solution for displaying the favorites management interface and diversifies this solution.

Optionally, in some embodiments of this application, before the displaying a favorites management interface, the method may further include: currently displaying, by the terminal and in the first application, the content corresponding to the first favorite object; and receiving, by the terminal, a favorites adding operation entered by the user, to add the content corresponding to the first favorite object to favorites. An implementation of adding the activity content to favorites by the user is provided herein. That is, before the favorites management interface is displayed, the user may add the activity content to favorites; and if the user adds nothing to favorites yet, or the terminal does not automatically add activity content to favorites, the favorites management interface is empty and no favorite object is displayed.

Optionally, in some embodiments of this application, before the displaying a favorites management interface, the method may further include: if the terminal detects a particular event and interrupts display of the currently displayed content corresponding to the first favorite object, adding, by the terminal, the content corresponding to the first favorite object to favorites. An implementation of automatically adding the activity content to favorites by the terminal is provided herein. It should be understood that the particular event herein may be receiving an incoming call, or may be receiving an SMS message, a notification message, or the like. That is, before the favorites management interface is displayed, the terminal may automatically add the activity content to favorites; and if the user adds nothing to favorites yet, or the terminal does not automatically add activity content to favorites, the favorites management interface is empty and no favorite object is displayed.

Optionally, in some embodiments of this application, the receiving, by the terminal, a favorites adding operation entered by the user, to add the content corresponding to the first favorite object to favorites may include: receiving, by the terminal, an operation of entering a second preset gesture on a display screen by the user, to add the content corresponding to the first favorite object to favorites. This embodiment mainly provides a specific implementation solution for manually adding the activity content to favorites by the user and increases feasibility of this solution.

Optionally, in some embodiments of this application, the receiving, by the terminal, a favorites adding operation entered by the user, to add the content corresponding to the first favorite object to favorites may include: receiving, by the terminal, an operation of selecting a third favorites icon from the function icon menu by the user, to add the content corresponding to the first favorite object to favorites. This embodiment mainly provides a specific implementation solution for manually adding the activity content to favorites by the user and increases feasibility of this solution.

Optionally, in some embodiments of this application, the receiving, by the terminal, a favorites adding operation entered by the user, to add the content corresponding to the first favorite object to favorites may include: receiving, by the terminal, an operation of selecting a fourth favorites icon under the virtual function button by the user, to add the content corresponding to the first favorite object to favorites. This embodiment mainly provides a specific implementation solution for manually adding the activity content to favorites by the user and increases feasibility of this solution.

Optionally, in some embodiments of this application, the adding the content corresponding to the first favorite object to favorites may include: saving, by the terminal, description information of the content corresponding to the first favorite object, where the description information includes application information, an activity identifier, and a content source identifier; and the responding to the operation to display, in the first application, content corresponding to the first favorite object may include: responding to the operation to obtain the description information; determining the first application based on the application information, determining, based on the activity identifier, a content activity corresponding to the first favorite object, and determining, based on the content source identifier, the content corresponding to the first favorite object; and displaying, in the first application, the content corresponding to the first favorite object.

A system defines an implementation of a description specification for describing activity content information, where the description specification may be used for describing activity resource information. In this way, a favorites adding manner based on the activity content is implemented. When the user wants to read the activity content again, the user can quickly open the activity displayed when the activity content is added to favorites. The favorite content can be directly opened based on an original application, and an original running state is retained. This improves user experience.

Optionally, in some embodiments of this application, the adding the content corresponding to the first favorite object to favorites may include: saving, by the terminal, description information of the content corresponding to the first favorite object, where the description information includes application information, an activity identifier, a content source identifier, and context status information; and the responding to the operation to display, in the first application, content corresponding to the first favorite object may include: responding to the operation to obtain the description information; determining the first application based on the application information, determining, based on the activity identifier, a content activity corresponding to the first favorite object, determining, based on the content source identifier, the content corresponding to the first favorite object, and determining, based on the context status information, the context status of the content corresponding to the first favorite object; and displaying, in the first application, the content corresponding to the first favorite object.

A system defines an implementation of a description specification for describing activity content information, where the description specification may be used for describing activity resource information and a context status. In this way, a favorites adding manner based on the activity content and the context status is implemented. When the user wants to read the activity content again, the activity displayed when the activity content is added to favorites may be quickly opened, or the activity displayed when the activity content is added to favorites may be opened and the context status added to favorites may be restored. The favorite content can be directly opened based on an original application, and an original running state is retained. This improves user experience.

Optionally, in some embodiments of this application, the adding the content corresponding to the first favorite object to favorites may include: saving, by the terminal, description information of the content corresponding to the first favorite object, where the description information includes application information, an activity identifier, and context status information; and the responding to the operation to display, in the first application, content corresponding to the first favorite object may include: responding to the operation to obtain the description information; determining the first application based on the application information, determining, based on the activity identifier, a content activity corresponding to the first favorite object, and determining, based on the context status information, the context status of the content activity corresponding to the first favorite object; and displaying, in the first application, the content corresponding to the first favorite object.

A system defines an implementation of a description specification for describing activity content information, where the description specification may be used for describing activity resource information and a context status. In this way, a favorites adding manner based on the activity content and the context status is implemented. When the user wants to read the activity content again, the activity displayed when the activity content is added to favorites may be quickly opened, or the activity displayed when the activity content is added to favorites may be opened and the context status added to favorites may be restored. The favorite content can be directly opened based on an original application, and an original running state is retained. This improves user experience.

A second aspect of the embodiments of this application provides a terminal, where the terminal has functions of managing favorite objects in different applications, and when a user views favorites, after an input operation performed on a favorite object by the user is received, displaying, in an original application, content corresponding to the favorite object. The functions may be implemented by using hardware or by executing corresponding software by hardware. The hardware or software includes one or more modules corresponding to the functions.

A third aspect of this application provides a computer readable storage medium, where the computer readable storage medium stores an instruction, and running of the instruction on a computer causes the computer to perform the method in the aspects. It should be noted that the technical solutions of this application essentially, or the part contributing to the prior art, or some or all of the technical solutions may be implemented in a form of a software product. The software product is stored in a storage medium, is configured to store computer software instructions used by the foregoing devices, and includes programs that are designed for the terminal and that are used to execute the first aspect.

The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

A fourth aspect of the embodiments of this application provides a computer program product including an instruction, where running of the computer program product on a computer causes the computer to perform the method in any one of the first aspect or any optional implementation of the first aspect.

The technical solutions provided in the embodiments of this application have the following beneficial effects:

The terminal currently displays the favorites management interface, where the first favorite object and the second favorite object are displayed on the favorites management interface; receives the operation entered by the user; and if the operation points to the first favorite object, responds to the operation to display, in the first application, the content corresponding to the first favorite object; or if the operation points to the second favorite object, responds to the operation to display, in the second application, the content corresponding to the second favorite object. When the user performs an input operation on a favorite object, activity content displayed when the activity content is added to favorites can be quickly displayed in an original application, improving user experience.

BRIEF DESCRIPTION OF DRAWINGS

FIG. 3A is a schematic diagram of performing a starting operation on a WeChat application on a terminal by a user;

FIG. 3B is a schematic diagram of an activity displayed after a WeChat application is started on a terminal;

FIG. 10A is a schematic diagram of current display of Moments of a WeChat application on a terminal;

FIG. 10B is a schematic diagram of display of a zoomed-in picture on a terminal;

FIG. 17A is a schematic diagram of display of a favorites management interface on a terminal;

FIG. 17B is a schematic diagram of display, on a terminal, an article displayed when the article is added to favorites previously;

FIG. 24A is a schematic diagram of receiving, by a terminal, voice input performed by a user;

FIG. 24B is a schematic diagram of display of a favorites management interface on a terminal;

DESCRIPTION OF EMBODIMENTS

The following describes the technical solutions in the embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Figure 1A:
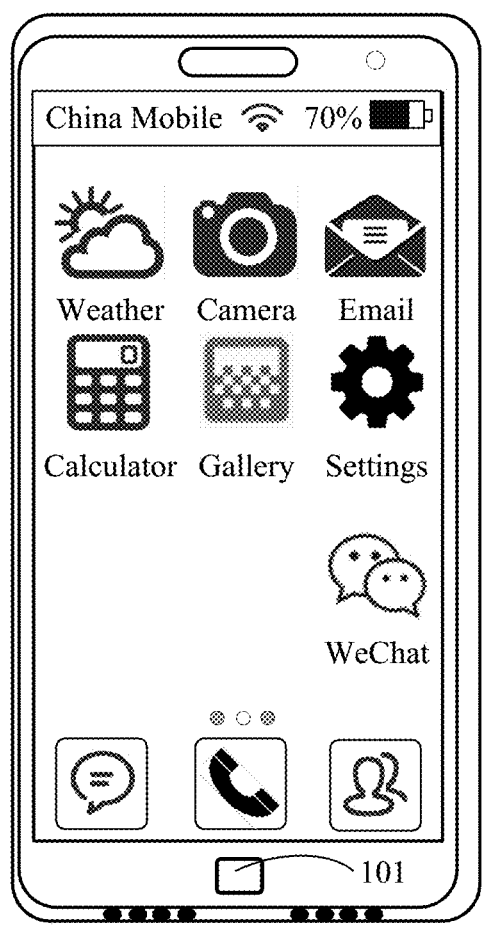
FIG. 1A is a schematic diagram of display of a home screen on a terminal.
Figure 1B:
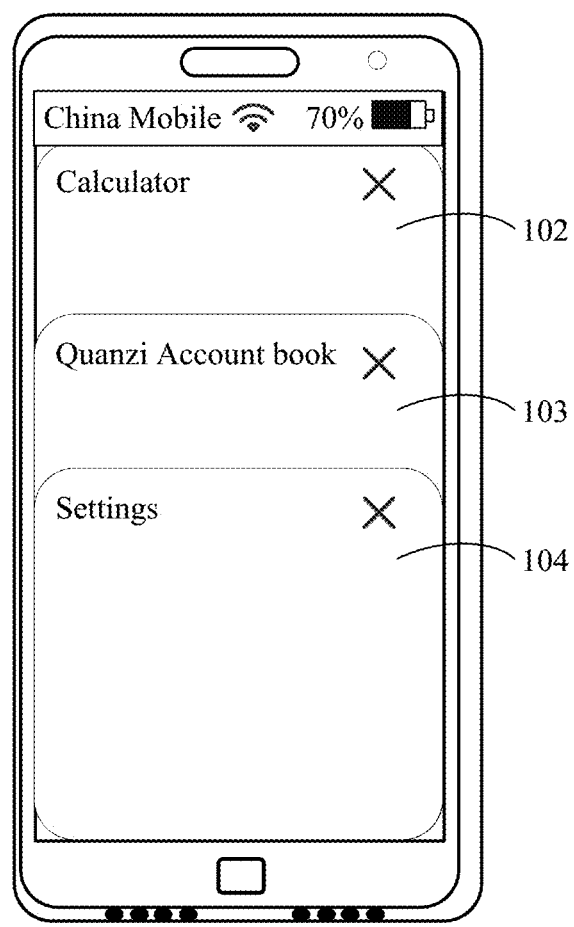
FIG. 1B is a schematic diagram of display of a recently-used application list on a terminal.

In some existing technologies, when a user uses an application (Application, APP) on a terminal, a message of another application may be received, or an incoming call from another terminal, or the like may be received, and a case of interrupting currently displayed activity content occurs. After interruption, how to quickly open the activity content displayed before interruption occurs? In the prior art, a system provides a function of displaying a recently-used application list. A user can quickly open, by using the recently-used application list, activity content temporarily stored by a system background. For example, FIG. 1A is a schematic diagram of display of a home screen on a terminal. As shown in FIG. 1A, a user may perform an operation such as double-tap, slide, or press on a home button 101, and an activity shown in FIG. 1B can be displayed. FIG. 1B is a schematic diagram of display of a recently-used application list on the terminal. As shown in FIG. 1B, the recently-used application list may be manually cleared by the user or sent to the recycle bin by a system. The recently-used application list includes, for example, Calculator 102, Quanzi Account book 103, and Settings 104.

The recently-used application list is obtained after current activity content and a current context status are added to favorites by temporarily storing an entire process in an application, so that the user can quickly open content added to favorites. For example, if a user needs to start an address book to search for a contact due to another reason when reading news by using a news APP, the news APP is temporarily stored; and the user can quickly open the previously read news content by using the recently-used application list after finding the contact. The recently-used application list is a process-based buffer. To be specific, the recently-used application list temporarily stores information about an entire process. However, a system resource is limited, and temporary storage cannot be performed all the time. With an increase of temporarily stored content, the system sends some temporarily stored resources to the recycle bin, or the user may manually clear the recently-used application list in a buffer, to release a system resource. For a resource recycling mechanism, the system sends a temporarily stored resource of a low-priority application to the recycle bin when resources are insufficient. Once the temporarily stored resource is sent to the recycle bin by the system, the user re-starts the corresponding application instead of activity content displayed on the application last time when opening the recently-used application list. This solution has a disadvantage: After the temporarily stored resource is sent to the recycle bin, a user needs to search for the activity content in the application again if the user wants to view activity content added to favorites, and this operation process is relatively complicated.

Further, the entire application process is temporarily stored in this solution; therefore, in an application, only one piece of activity information instead of a plurality of pieces of activity information can be temporarily stored. For a scenario in which a user voluntarily exits, the last piece of activity information is saved in the buffer. The process (Process) is an activity performed regarding a data set by a program in a computer, is a base unit for performing resource allocation and scheduling by the system, and is a structural basis of an operating system. The program is a description of an instruction, data, and an organizational form thereof. The process is a program entity.

In some existing technologies, activity content may be further added to favorites by an application program having a particular function. The application program may also be referred to as a favorites application. The favorites application is used to receive information sent by other applications and add all the information to favorites. For example, during news reading, news content can be selected, and content to be added to favorites can be shared to another application such as Evernote (evernote) through sharing. During reading, the content is directly opened and read in Evernote.

This solution has a disadvantage: This favorites application adds media content to favorites, but cannot add non-media content to favorites. For example, favorite content is read in the favorites application, a context status that is read in an original application when the content is added to favorites cannot be restored, and a typesetting effect of media content in the original application cannot be reproduced. A current general favorites application cannot add an activity itself of any application instead of media-class content itself to favorites. It should be understood that the media content is content such as a character, a picture, news, or a video, and is content mainly used for transferring information. The non-media content is similar to a game, a chat, or a tool, and is content mainly for actual application.

Figure 2A:
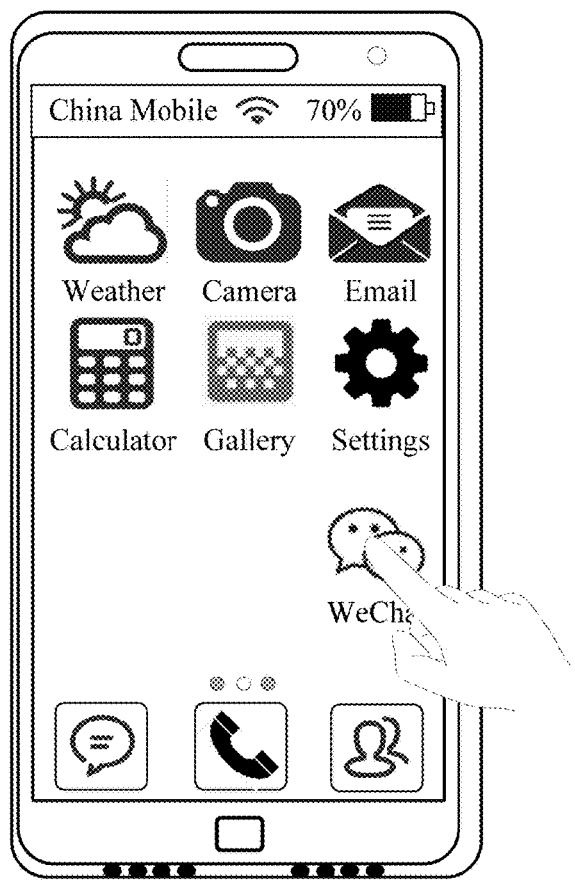
FIG. 2A is a schematic diagram of performing a starting operation on a WeChat application by a user.
Figure 2B:
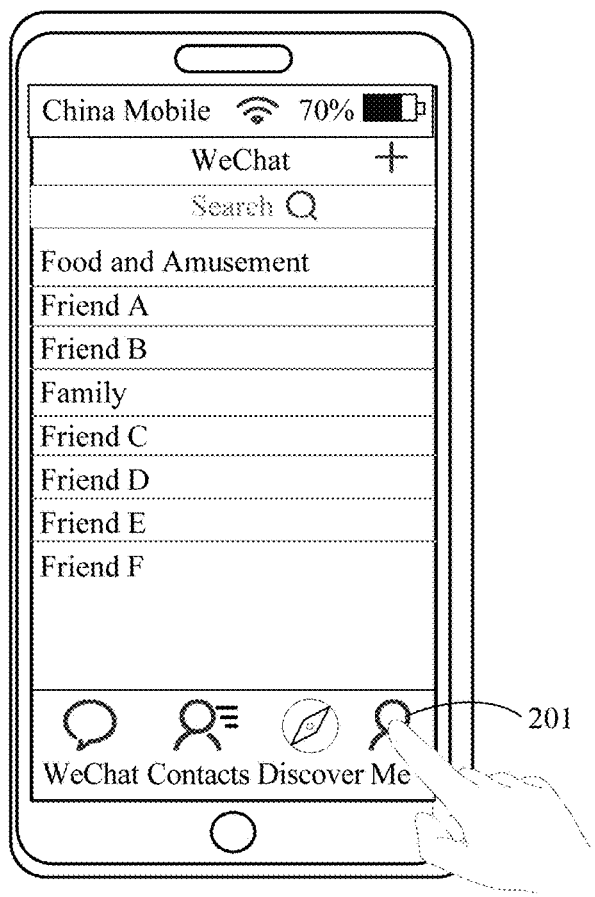
FIG. 2B is a schematic diagram of display of activity content of a WeChat application on a terminal.
Figure 2C:
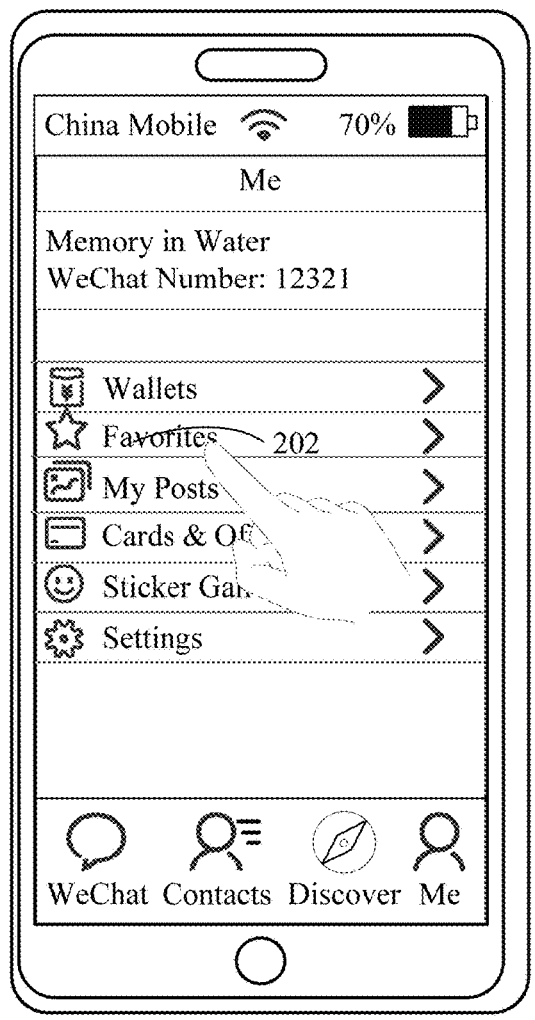
FIG. 2C is a schematic diagram of display on a terminal after an "Me" icon is opened.
Figure 2D:
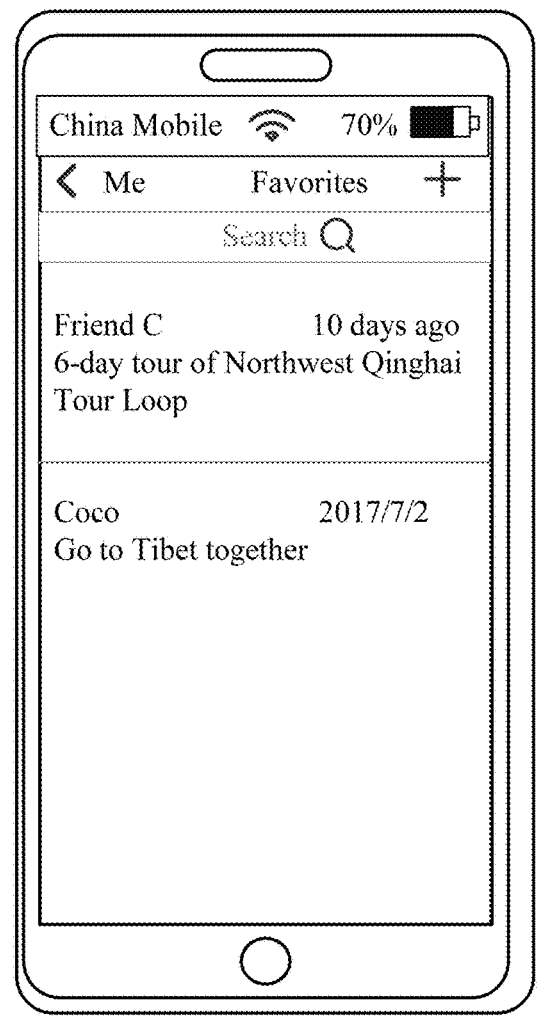
FIG. 2D is a schematic diagram of display of a favorites list in a WeChat application on a terminal.

In some existing technologies, a favorites function can be implemented inside an application, for example, a favorites folder of a browser or Favorites of WeChat Moments. This solution has disadvantages: This favorites function is inapplicable to other applications, and is implemented only within the corresponding application, and therefore is not for general use. To view favorite content, a user needs to start a corresponding application and find a corresponding favorites function. This operation process is relatively complicated. For example, FIG. 2A is a schematic diagram of performing a starting operation on a WeChat application by a user. The terminal responds to the operation of starting a WeChat application by a user, and displays an activity shown in FIG. 2B. FIG. 2B is a schematic diagram of display of activity content of the WeChat application on the terminal and of opening "Me" 201. As shown in FIG. 2B, a user opens the "Me" icon 201, and an activity shown in FIG. 2C is displayed. FIG. 2C is a schematic diagram of display on the terminal after the "Me" icon 201 is opened. After the "Favorites" icon 202 is tapped, an activity shown in FIG. 2D can be displayed. FIG. 2D is a schematic diagram of a favorites list in a WeChat application displayed on the terminal.

The foregoing operation process of viewing the favorite content is relatively complicated. When activity content added to favorites in an application program having a particular function is viewed, a typesetting effect of the activity content in an original application cannot be reproduced, or there is another disadvantage. In view of the disadvantages, an embodiment of this application provides a favorite-object display method. After a terminal adds activity content of an application to favorites, when a user views favorite content, a first favorite object and a second favorite object are displayed on a favorites management interface displayed on the terminal; the terminal receives an operation entered by the user; and if the operation points to the first favorite object, the terminal responds to the operation to display, in a first application, content corresponding to the first favorite object; or if the operation points to the second favorite object, the terminal responds to the operation to display, in a second application, content corresponding to the second favorite object. Because the favorites management interface displays favorite objects in all applications, a user interface that can be used to view different applications added to favorites is provided for the user, so that the applications can be managed together. In addition, if the operation entered by the user points to the first favorite object, the content corresponding to the first favorite object is displayed in the first application. That is, the content corresponding to the first favorite object can be displayed in an original application in which the content corresponding to the first favorite object is added to favorites, so as to reproduce a typesetting effect of the activity content in the original application. If the operation entered by the user points to a second operation object, a similar effect is achieved. No details are repeated herein.

The favorites management interface may include various favorite objects. The favorite objects may be presented as "an application name and a file name (for example, an article title, a picture name, a video name, or a music name)", or may be presented as "an application name, a file name (for example, an article title, a picture name, a video name, or a music name), and time", or may be presented in another manner. This is not specifically limited. It can be understood that both the content corresponding to the first favorite object and the content corresponding to the second favorite object may be activity content. The activity content includes media content and non-media content.

In the technical solutions of this application, a system defines a description specification for activity content, and the terminal saves description information of the activity content when the activity content to favorites is added. The description information may include application information (package name), an activity identifier (activity ID), and a content source identifier (resource ID); or the description information may include: a package name, an activity ID, a resource ID, and context status information (context Info); or the description information may include a package name, an activity ID, and context Info. It should be noted that the package name is a unique identifier used to identify each application installed on the terminal. The activity ID is an ID used to uniquely identify each of different activities in an application. It can be understood that the different activities may mean IDs of different resources types, for example, a picture, an article, a video, and music. The resource ID is used to uniquely identify each of different pieces of resource information in an application, and is an ID used to manage an application resource of an application. The context status information may include information such as a reading status state (whether reading is completed), a reading progress rate (for example, an activity reading percentage), and current display position.

The terminal can determine, based on application information, an application to which the favorite object points; can determine, based on the activity identifier, an activity to which the favorite object points; can determine activity content by using the resource ID; and can determine a context status of the activity content based on the context Info. It can be understood that the description information is similar to an index, that is, the terminal can find corresponding data based on the description information. When the user views the favorite content, based on the description information, the terminal restores the activity content, displayed when the activity content is added to favorites previously, in the original application, or restores the activity content, displayed when the activity content is added to favorites previously, in the original application and the context status of the activity content. The activity content may include media content and non-media content. Therefore, when favorite content is viewed, the favorite content does not need to be viewed in a favorites function of the original application. This operation process is relatively simple, improving user experience.

It should be noted that the favorite-object display method provided in this embodiment of this application can be applied to a mobile terminal. For example, the mobile terminal may be a device such as a mobile phone, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, or a smartwatch. No special limitation is imposed on a specific form of the mobile terminal in this embodiment of this application.

Figure 19:
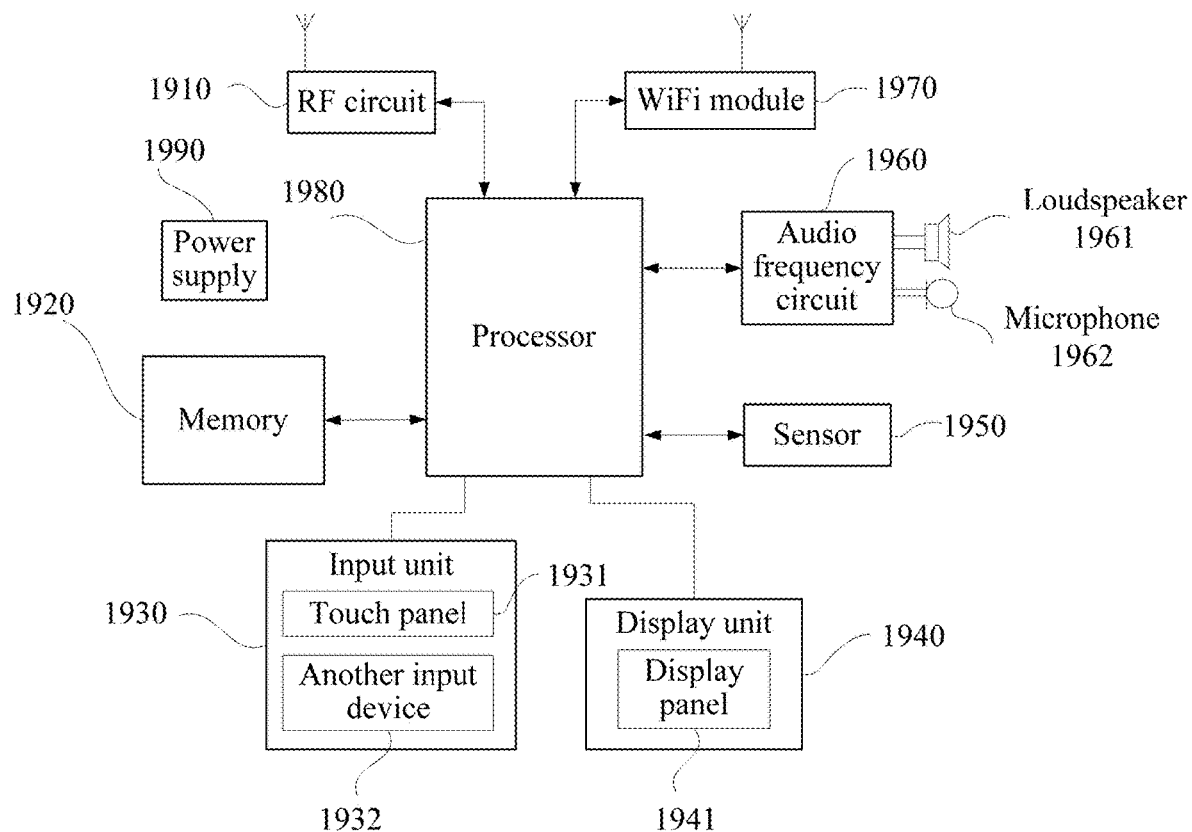
FIG. 19 is a schematic diagram of an embodiment of a terminal according to an embodiment of this application.

In this embodiment of this application, a favorites adding method provided in this application is described by using an example in which the mobile terminal is a mobile phone. Constituent components of the mobile phone are specifically described in the following with reference to FIG. 19. FIG. 19 is a block diagram of some structures of a smartphone related to a terminal according to an embodiment of this application. Referring to FIG. 19, the mobile phone includes components such as an input unit 1930, a display unit 1940, a processor 1980, a radio frequency (Radio Frequency, RF) circuit 1910, a memory 1920, a sensor 1950, an audio frequency circuit 1960, a Wireless Fidelity (wireless fidelity, WiFi) module 1970, and a power supply 1990. A person skilled in the art may understand that the structure of the mobile phone shown in FIG. 19 constitutes no limitation on the mobile phone, and the mobile phone may include more or fewer components than those shown in FIG. 19, combine some components, or have different component deployments.

Constituent components of the mobile phone are specifically described in the following with reference to FIG. 19.

The display unit 1940 can be configured to display information entered by a user or information provided for a user, and various menus of the mobile phone. In this embodiment of this application, the display unit 1940 is configured to: display a favorites management interface, where a first favorite object and a second favorite object are displayed on the favorites management interface; and if the operation points to the first favorite object, respond to the operation to display, in a first application, content corresponding to the first favorite object; or if the operation points to the second favorite object, respond to the operation to display, in a second application, content corresponding to the second favorite object.

The display unit 1940 may include a display panel 1941. Optionally, the display panel 1941 may be configured in a form of a liquid crystal display (Liquid Crystal Display, LCD), an organic light-emitting diode (Organic Light-Emitting Diode, OLED), or the like. Further, the touch panel 1931 may cover the display panel 1941. After detecting a touch operation on or near the touch panel 1931, the touch panel 1931 transfers the touch operation to the processor 1980 to determine a type of the touch event. Then the processor 1980 provides corresponding visual output on the display panel 1941 according to the type of the touch event. Although in FIG. 19, the touch panel 1931 and the display panel 1941 are used as two separate components to implement input and input functions of the mobile phone, in some embodiments, the touch panel 1931 may be integrated with the display panel 1941 to implement the input and output functions of the mobile phone.

The input unit 1930 can be configured to: receive entered digital or character information, and generate key signal input related to a user setting and function control of the mobile phone. In this embodiment of this application, the input unit 1930 is configured to receive an operation entered by the user. Specifically, the input unit 1930 may include a touch panel 1931 and another input device 1932. The touch panel 1931, also referred to as a touchscreen, can collect a touch operation performed by the user on or near the touch panel 1931 (for example, an operation performed on or near the touch panel 1931 by the user by using a finger, a stylus, or any other proper object or accessory), and drive a corresponding connection apparatus according to a preset program. Optionally, the touch panel 1931 may include two components: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into contact coordinates, and sends the contact coordinates to the processor 1980, and can receive and execute a command sent by the processor 1980. In addition, the touch panel 1931 may be implemented in a plurality of types, such as a resistive type, a capacitive type, an infrared type, and a surface acoustic wave type. In addition to the touch panel 1931, the input unit 1930 may further include the another input device 1932. Specifically, the another input device 1932 may include but is not limited to one or more of a physical keyboard, a function button (such as a volume control button or an on/off button), a trackball, a mouse, and a joystick.

The processor 1980 is a control center of the mobile phone, and connects various components of the entire mobile phone by using various interfaces and lines. The processor 1980 implements various functions of the mobile phone and processes data, by running or executing the software program and/or the module stored in the memory 1920, and invoking data stored in the memory 1920, so as to monitor the entire mobile phone. Optionally, the processor 1980 may include one or more processing units. Preferably, the processor 1980 may be integrated with an application processor and a modem processor. The application processor mainly processes an operating system, a user interface, an application program, and the like, and the modem processor mainly process wireless communication. It can be understood that the foregoing modem processor may alternatively not be integrated into the processor 1980.

The memory 1920 can be configured to store a software program and module. The processor 1980 executes various function applications of the mobile phone and processes data, by running the software program and module stored in the memory 1920. The memory 1920 may mainly include a program storage area and a data storage area. The program storage area may store an operating system, an application program required by at least one function (such as a sound playback function and an image playback function), and the like. The data storage area may store data (such as audio data and a phone book) created according to use of the mobile phone, and the like. In addition, the memory 1920 may include a high-speed random access memory, and may further include a non-volatile memory such as at least one disk storage device, a flash memory device, or another volatile solid-state storage device.

The mobile phone may further include at least one sensor 1950 such as an optical sensor, a motion sensor, or another sensor. Specifically, the optical sensor may include an ambient light sensor and a proximity sensor. The ambient light sensor may adjust luminance of the display panel 1941 according to brightness of ambient light. The proximity sensor may turn off the display panel 1941 and/or backlight when the mobile phone is moved to an ear. As a type of motion sensor, an accelerometer sensor can detect a value of an acceleration in each direction (usually, in three axes), can detect a value and a direction of gravity when the mobile phone is static, and can be configured to identify application of a mobile phone posture (such as switch between landscape and portrait screens, a related game, or magnetometer posture calibration), a vibration-recognition related function (such as a pedometer or a tap), and the like. A gyroscope, a barometer, a hygrometer, a thermometer, an infrared sensor, and another sensor may be further provided for the mobile phone, and details are not described herein.

An audio frequency circuit 1960, a loudspeaker 1961, and a microphone 1962 may provide an audio interface between the user and the mobile phone. The audio frequency circuit 1960 can transmit, to the loudspeaker 1961, an electrical signal obtained by converting received audio data, and the loudspeaker 1961 converts the electrical signal into an acoustic signal and outputs the acoustic signal. In addition, the microphone 1962 converts a collected acoustic signal into an electrical signal; the audio frequency circuit 1960 receives the electrical signal and converts the electrical signal into audio data, and outputs the audio data to the processor 1980 for processing; and processed audio data is sent to, for example, another mobile phone through the RF circuit 1910, or audio data is output to the memory 1920 for further processing.

The RF circuit 1910 can be configured to receive/send a signal in an information receiving/sending process or during a call, and in particular, after receiving downlink information of a base station, send the downlink information to the processor 1980 for processing; and in addition, sends uplink data to the base station. The RF circuit 1910 usually includes but is not limited to an antenna, at least one amplifier, a transceiver, a coupler, a low noise amplifier (Low Noise Amplifier, LNA), a duplexer, and the like. In addition, the RF circuit 1910 may also communicate with a network and other devices through wireless communication. Any communications standard or protocol may be used during wireless communication, including but not limited to Global System for Mobile Communications (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an e-mail, a short message service (Short Messaging Service, SMS), and the like.

WiFi belongs to a short-distance wireless transmissions technology. By using the WiFi module 1970, the mobile phone can help the user receive/send an email, browse a web page, access streaming media, and the like. The WiFi module 1970 provides wireless access to the broadband Internet for the user. Although FIG. 19 shows the WiFi module 1970, it can be understood that the WiFi module 1970 is not a necessary constituent of the mobile phone and may be omitted well as required provided that the essence of the present invention is not changed.

The mobile phone further includes the power supply 1990 (for example, a battery) that supplies power to the various components. Preferably, the power supply may be logically connected to the processor 1980 by using a power management system, so as to implement functions such as charge management, discharge management, and power consumption management by using the power management system.

Although not shown, the mobile phone may further include a camera, a Bluetooth module, and the like, and details are not described herein.

Optionally, in some embodiments of this application, the first favorite object is added to favorites by using a favorites entrance provided by the first application.

Optionally, in some embodiments of this application, the first favorite object is added to favorites by using a favorites entrance provided by the terminal, and the favorites entrance provided by the terminal is different from the favorites entrance provided by the first application.

Optionally, in some embodiments of this application,
the display unit 1940 is further configured to: if the content corresponding to the first favorite object is displayed, restore and display a context status that is at a time when the content corresponding to the first favorite object is added to favorites; or if the content corresponding to the second favorite object is displayed, restore and display a context status that is at a time when the content corresponding to the second favorite object is added to favorites.

Optionally, in some embodiments of this application, the processor 1980 is configured to: perform classified management on the first favorite object and the second favorite object based on an application type; or perform classified management on the first favorite object and the second favorite object based on a favorites type.

Optionally, in some embodiments of this application, the input unit 1930 is further configured to receive a first gesture entered by the user; and the display unit 1940 is specifically configured to: if the first gesture matches a preset gesture, display the favorites management interface.

Optionally, in some embodiments of this application, the display unit 1940 is specifically configured to: receive an operation of selecting a first favorites icon from a function icon menu by the user, and display the favorites management interface.

Optionally, in some embodiments of this application, the display unit 1940 is specifically configured to: receive an operation of selecting a second favorites icon under a virtual function button by the user, and display the favorites management interface.

Optionally, in some embodiments of this application, the display unit 1940 is further configured to currently display, in the first application, the content corresponding to the first favorite object; and the processor 1980 is further configured to receive a favorites adding operation entered by the user, to add the content corresponding to the first favorite object to favorites.

Optionally, in some embodiments of this application, the processor 1980 is further configured to: if detecting a particular event and interrupting display of the currently displayed content corresponding to the first favorite object, add the content corresponding to the first favorite object to favorites.

Optionally, in some embodiments of this application, the processor 1980 is further configured to receive an operation of entering a second preset gesture on a display screen by the user, to add the content corresponding to the first favorite object to favorites.

Optionally, in some embodiments of this application, the processor 1980 is specifically configured to receive an operation of selecting a third favorites icon from the function icon menu by the user, to add the content corresponding to the first favorite object to favorites.

Optionally, in some embodiments of this application, the processor 1980 is specifically configured to receive an operation of selecting a fourth favorites icon under the virtual function button by the user, to add the content corresponding to the first favorite object to favorites.

Optionally, in some embodiments of this application, the processor 1980 is specifically configured to save description information of the content corresponding to the first favorite object, where the description information includes application information, an activity identifier, and a content source identifier; and the display unit 1940 is specifically configured to: respond to the operation to obtain the description information; determine the first application based on the application information, determine, based on the activity identifier, a content activity corresponding to the first favorite object, and determine, based on the content source identifier, the content corresponding to the first favorite object; and display, in the first application, the content corresponding to the first favorite object.

Optionally, in some embodiments of this application, the processor 1980 is specifically configured to save description information of the content corresponding to the first favorite object, where the description information includes application information, an activity identifier, a content source identifier, and context status information; and the display unit 1940 is specifically configured to: respond to the operation to obtain the description information; determine the first application based on the application information, determine, based on the activity identifier, a content activity corresponding to the first favorite object, determine, based on the content source identifier, the content corresponding to the first favorite object, and determine, based on the context status information, the context status of the content corresponding to the first favorite object; and display, in the first application, the content corresponding to the first favorite object.

The following further describes the technical solution of this application by using the following implementations.

The terminal is currently connected to available Wireless Fidelity (Wireless Fidelity, WiFi) or mobile data is enabled, and at least one application is installed on the terminal. Descriptions are provided by using an example in which a user uses a WeChat application (WeChat) on the terminal. The terminal responds to an operation (for example, a tap operation, a touch operation, or a press operation) of starting the WeChat application by the user, to start the WeChat application.

Figures 3C, 3D:
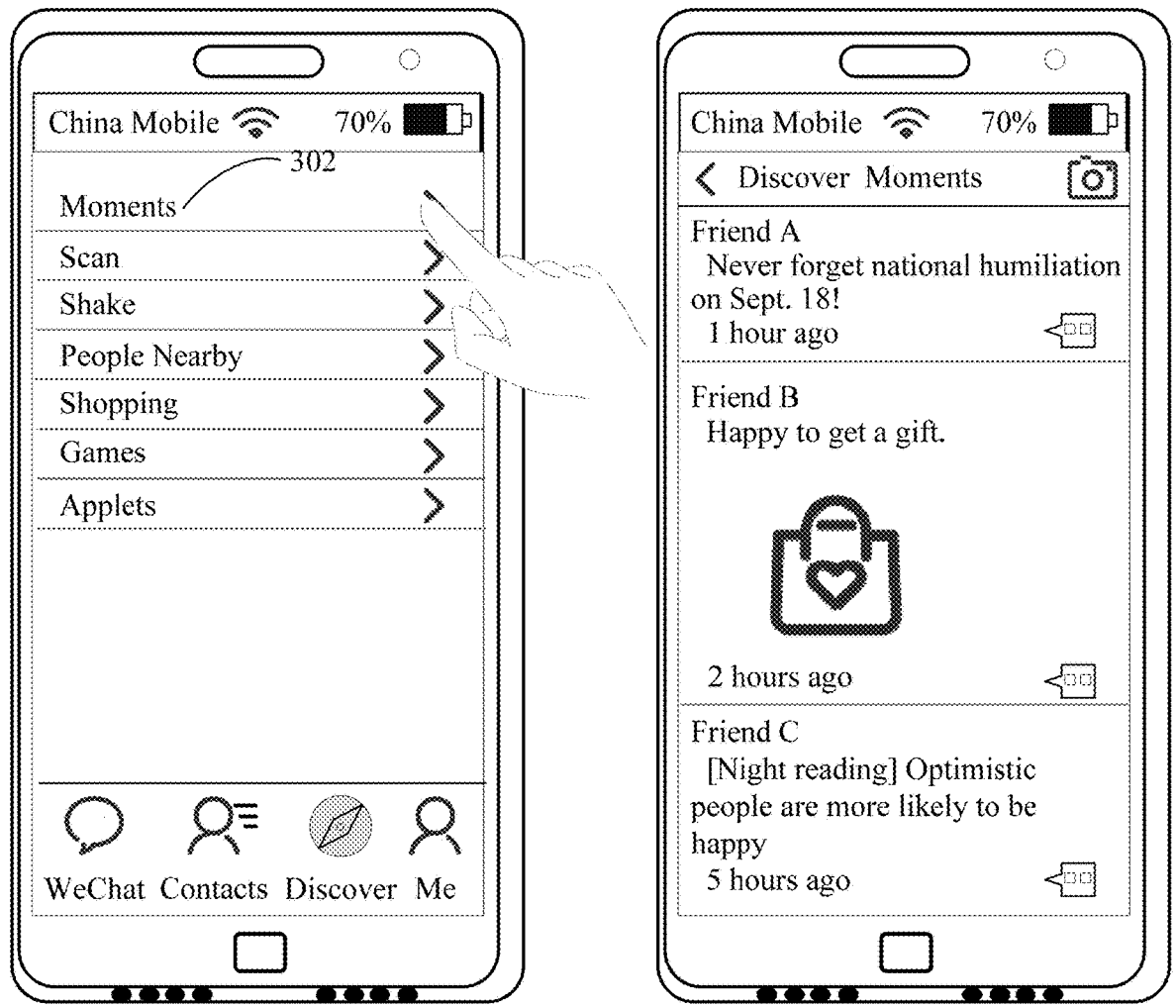
FIG. 3C is a schematic diagram of options included in "Discover" displayed on a terminal.
FIG. 3D is a schematic diagram of display of Moments on a terminal.

For example, FIG. 3A is a schematic diagram of performing a starting operation on the WeChat application on the terminal by the user. After the starting operation is performed on the WeChat application shown in FIG. 3A, an activity is displayed, as shown in FIG. 3B. FIG. 3B is a schematic diagram of the activity displayed after the WeChat application is started on the terminal. As shown in FIG. 3B, icons including "WeChat", "Address book", "Discover" 301, "Me", and the like may be displayed. After a starting operation (for example, a tap operation, a press operation, or a touch operation) is performed on "Discover" 301 displayed in FIG. 3B, an activity is displayed, as shown in FIG. 3C. FIG. 3C is a schematic diagram of options included in "Discover" 301 displayed on a terminal. As shown in FIG. 3C, information including Moments 302, Scan, Shake, Shopping, Games, Applets, and the like may be displayed. A starting operation (for example, a tap operation, a press operation, or a touch operation) may be performed on Moments 302 shown in FIG. 3C, and an activity is displayed, as shown in FIG. 3D. FIG. 3D is a schematic diagram of display of Moments on the terminal.

The foregoing provides descriptions mainly by using the WeChat application as an example. The user can use any function provided in the WeChat application, to satisfy the user's requirement, bringing good user experience. The user can further use a news APP to read news, use Sina Weibo to refresh Weibo, use Alipay to perform payment, use QQ to have a chat, use Baidu Map to search for a route line, or the like.

It should be noted that the favorites entrance provided in this embodiment of this application is system-specific, has system-level permissions. This is different from that of the favorites entrance provided by an application itself.

The following mainly provides descriptions for adding activity content of the WeChat application to favorites by the terminal. A manner of adding activity content of an application to favorites by the terminal is described by using the following several specific scenarios as an example.

Figure 4:
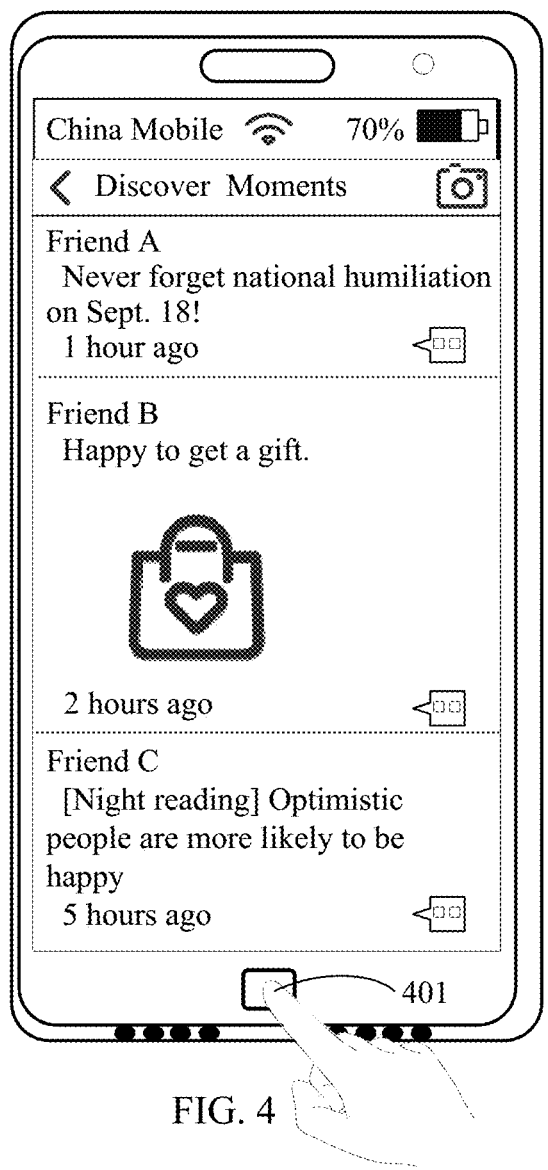
FIG. 4 is a schematic diagram of adding activity content of a WeChat application to favorites by a terminal.

Scenario 1: The terminal currently displays the activity content in the application, and responds to an operation performed on a particular function button by the user, to add the activity content to favorites. The particular function button may be a home button, a volume up button, a volume down button, another button, a combination of at least two buttons, or the like. This is not specifically limited herein. For example, FIG. 4 is a schematic diagram of adding the activity content of the WeChat application to favorites by the terminal. As shown in FIG. 4, when using the WeChat application on the terminal to refresh moments, the user may want to use another application to satisfy a corresponding requirement, for example, using Alipay to perform payment. When needing to exit from the Moments, the user may perform a tap operation, a press operation, a touch operation, or the like on the home button 401. When detecting the operation performed on the home button 401 by the user, the terminal automatically adds the currently displayed activity content of the WeChat application to favorites. After payment is completed by using Alipay, the user can quickly view moments and context status previously added to favorites in a favorites list.

Figure 5A:
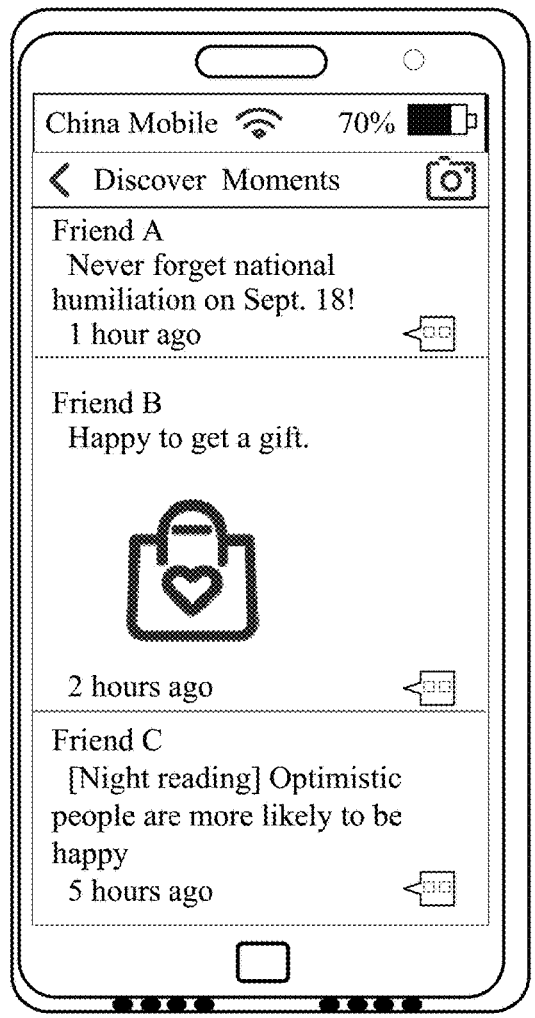
FIG. 5A is a schematic diagram of current display of activity content of a WeChat application on a terminal.
Figure 5B:
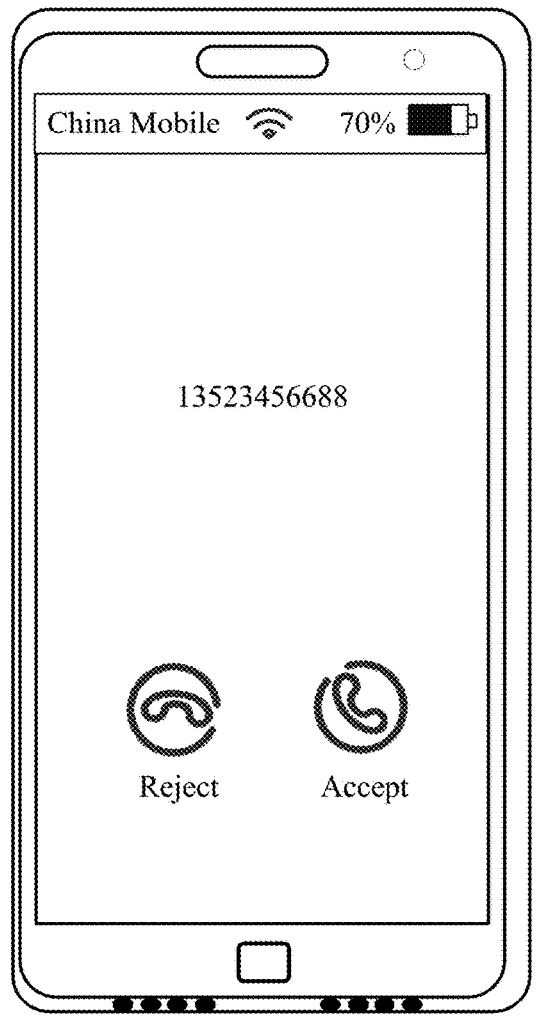
FIG. 5B is a schematic diagram of receiving an incoming call by a terminal.

Scenario 2: The terminal currently displays the activity content in the application; and if detecting a particular event, the terminal adds the activity content to favorites. The particular event may include an event such as receiving an incoming call or viewing a notification message, an SMS message, or the like. For example, if the terminal interrupts display of the currently displayed activity content of the WeChat application, the terminal automatically adds the activity content to favorites. FIG. 5A is a schematic diagram of current display of the activity content of the WeChat application on the terminal. It is assumed that the user receives an incoming call when using the WeChat application on the terminal to view moments, as shown in FIG. 5B. Reception of the incoming call interrupts an operation of viewing the moments; the terminal detects an interrupt event that the incoming call interrupts display of the currently displayed activity content of the WeChat application, and triggers automatic adding, to favorites, the activity content of the WeChat application that is displayed before interruption occurs. FIG. 5B is a schematic diagram of receiving an incoming call by the terminal.

It should be understood that FIG. 5A and FIG. 5B show an example in which the terminal interrupts display of the currently displayed activity content of the WeChat application when receiving the incoming call. A scenario of interrupting currently displayed activity content of an application may further include a scenario of receiving a video chat or a voice chat initiated by a friend in another application such as WeChat or QQ, receiving and viewing an SMS message, viewing a notification message, viewing a message sent by a friend, or the like. All of these scenarios are scenarios of interrupting display of the currently displayed activity content of the application by the terminal. The terminal can automatically add the activity content of the application to favorites.

Figure 6A:
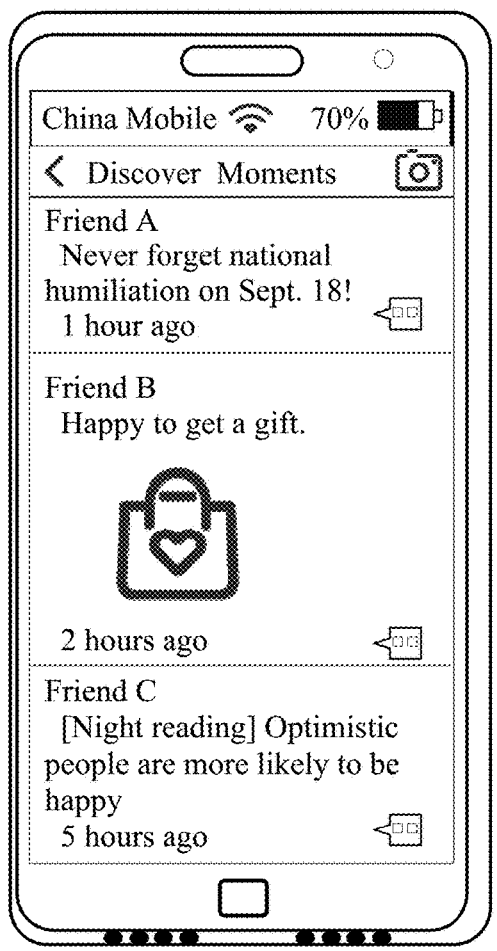
FIG. 6A is a schematic diagram of current display of activity content of a WeChat application on a terminal.
Figure 6B:
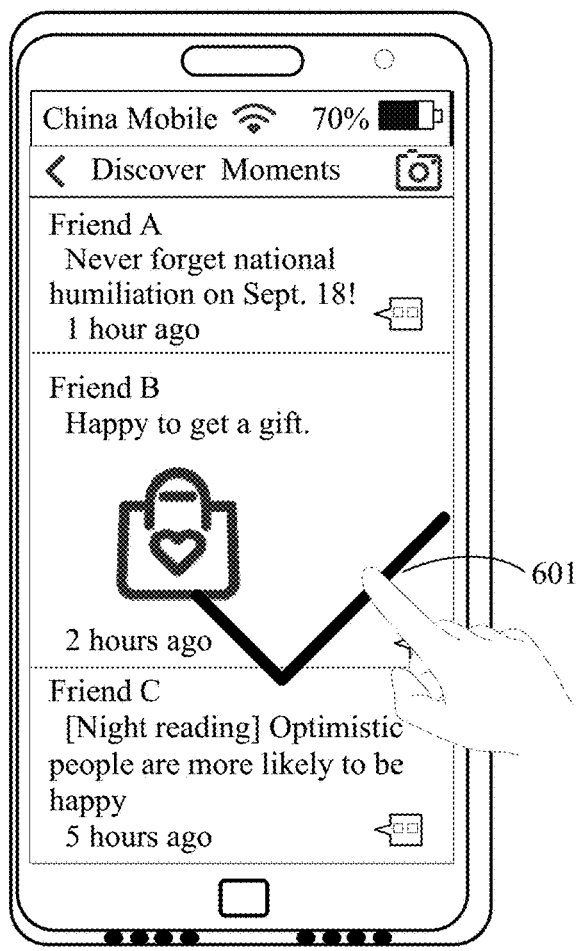
FIG. 6B is a schematic diagram of entering a particular gesture by a user on a terminal.

Scenario 3: The terminal currently displays the activity content in the application; and if detecting a particular gesture entered by the user, the terminal adds the activity content to favorites. For example, the terminal currently displays the activity content of the WeChat application, and responds to a gesture entered by the user on a display screen, to add the activity content of the WeChat application to favorites. FIG. 6A is a schematic diagram of current display of the activity content of the WeChat application on the terminal. In the activity shown in FIG. 6A, the user can enter the particular gesture, as shown in FIG. 6B, to add, to favorites, activity content of the WeChat application that is currently displayed by the terminal. FIG. 6B is a schematic diagram of entering the particular gesture by the user on the terminal. As shown in FIG. 6B, the particular gesture entered by the user is drawing a tick 601 on a screen.

It should be understood that the particular gesture may be preset by the user or may be preset by the terminal. That is, when detecting the particular gesture entered by the user, the terminal performs an operation of adding the currently displayed activity content to favorites. The particular gesture may be the tick 601, or may be a circle, a five-pointed star, another digit, a character, or the like. This is not specifically limited.

Figure 20A:
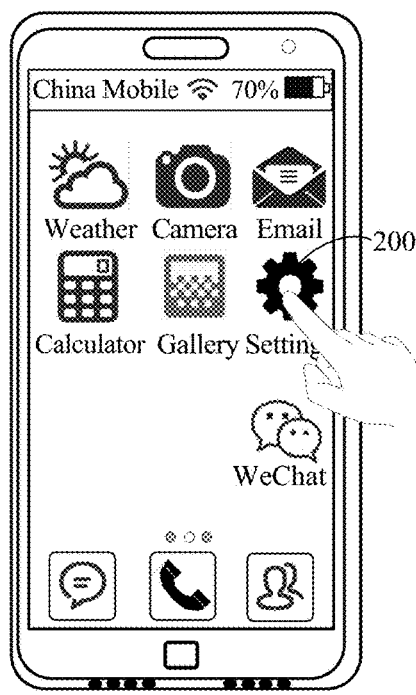
FIG. 20A is a schematic diagram of performing a starting operation on a Settings application on a terminal by a user.
Figure 20B:
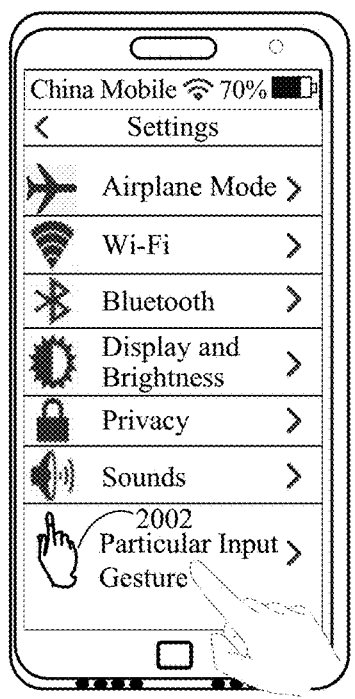
FIG. 20B is a schematic diagram of an activity displayed after a WeChat application is started on a terminal.
Figure 20C:
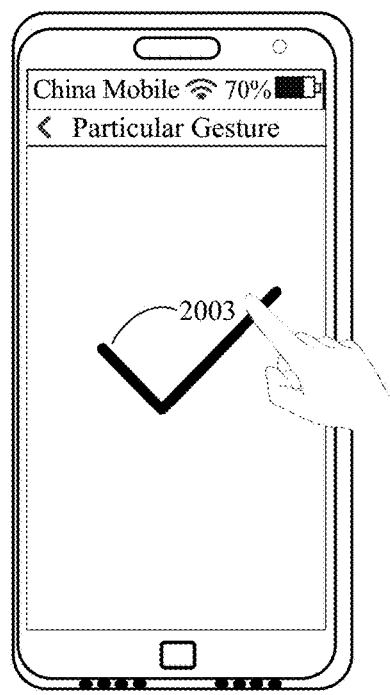
FIG. 20C is a schematic diagram of display of setting and entering of a particular gesture by a user on a terminal.

For example, FIG. 20A is a schematic diagram of performing a starting operation on a Settings application 2001 on the terminal by the user. After the starting operation is performed on the Settings application 2001 shown in FIG. 20A, an activity is displayed, as shown in FIG. 20B. FIG. 20B is a schematic diagram of the activity displayed after the WeChat application is started on the terminal. As shown in FIG. 20B, an Airplane Mode icon, a WiFi icon, a Bluetooth icon, a Display and Brightness icon, a Privacy icon, a Sounds icon, and a Particular Input Gesture icon 2002 are included. After a starting operation (for example, a tap operation, a press operation, or a touch operation) is performed on the Particular Input Gesture icon 2002 displayed in FIG. 20B, an activity is displayed, as shown in FIG. 20C. FIG. 20C is a schematic diagram of display of setting and entering of the particular gesture by the user on the terminal. In FIG. 20C, the user may enter a gesture, to be specific, the tick 2003. If the user enters a tick when browsing activity content of an application in future, the user can add currently browsed activity content to favorites.

Figure 7A:
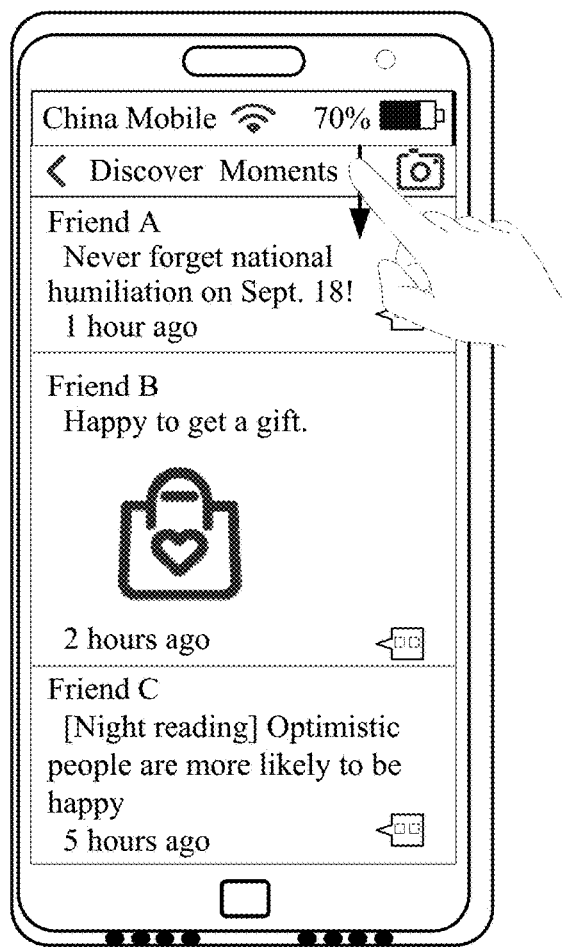
FIG. 7A is a schematic diagram of current display of activity content of a WeChat application on a terminal.
Figure 7B:
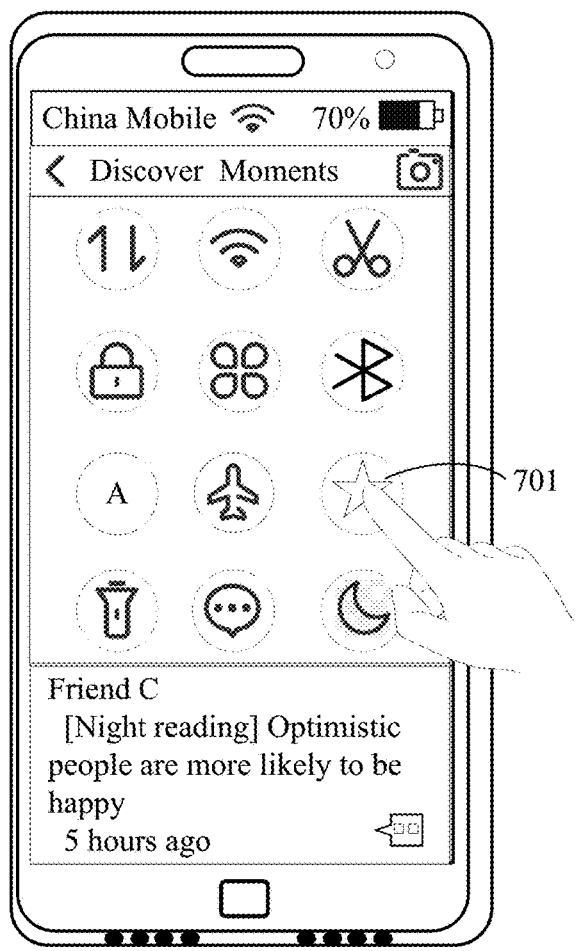
FIG. 7B is a schematic diagram of display of a function icon option in a drop-down menu on a terminal.

Scenario 4: The terminal currently displays the activity content in the application; and the terminal responds to an operation of selecting a favorites icon from a function icon menu by the user, to add the activity content to favorites. For example, FIG. 7A is a schematic diagram of current display of the activity content of the WeChat application on the terminal. As shown in FIG. 7A, the user may perform an operation of dropping down a function icon menu, and an activity shown in FIG. 7B is displayed. FIG. 7B is a schematic diagram of display of a function icon option in the drop-down menu on the terminal. In FIG. 7B, the user may perform a selection operation on the favorites icon 701, for example, an operation such press, double-tap, touch, or slide. The terminal responds to the selection operation performed on the favorites icon 701 by the user, to add the currently displayed activity content of the WeChat application to favorites.

It should be understood that in FIG. 7B, the favorites icon in the drop-down menu is merely an example. The icon may be in another pattern or may be a character prompt icon, provided that the icon is corresponding to a favorites function.

Figure 8A:
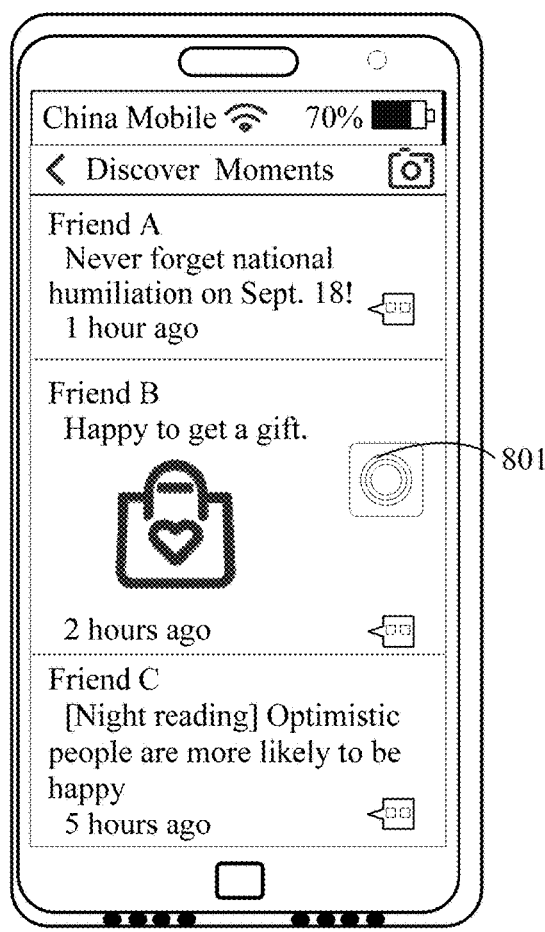
FIG. 8A is a schematic diagram of current display of activity content of a WeChat application on a terminal.
Figure 8B:
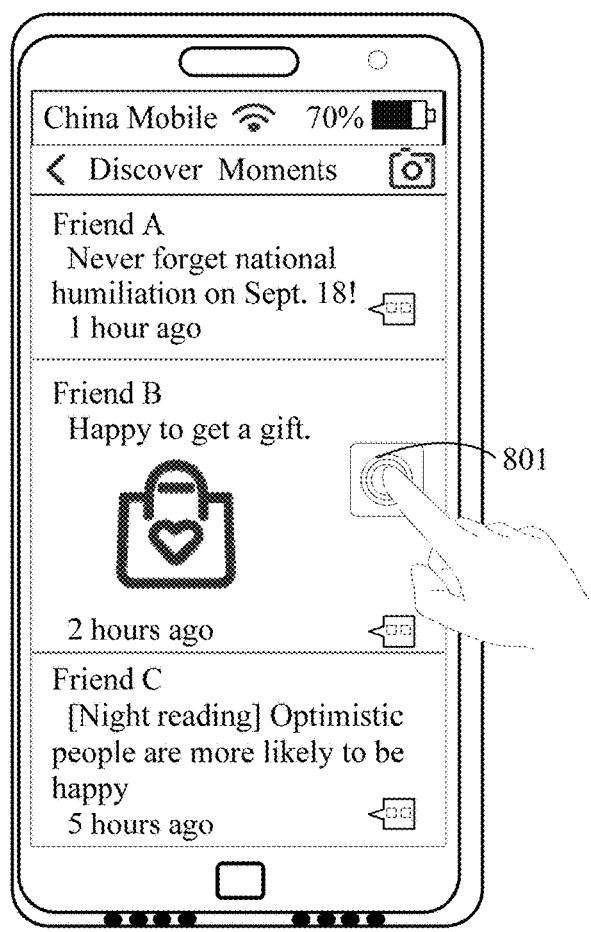
FIG. 8B is a schematic diagram of performing a starting operation on a virtual function button by a user.
Figure 8C:
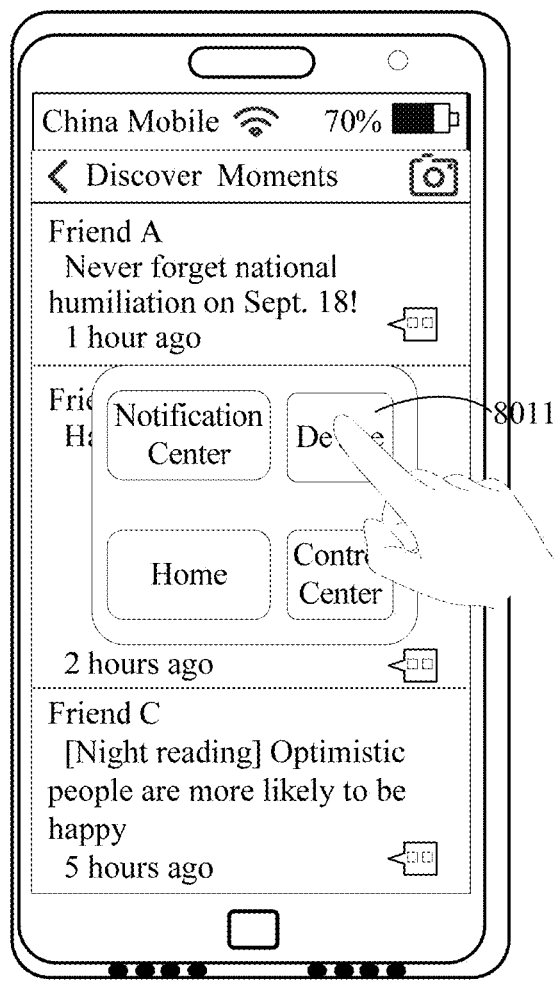
FIG. 8C is a schematic diagram of display of a function option under a virtual function button on a terminal.
Figure 8D:
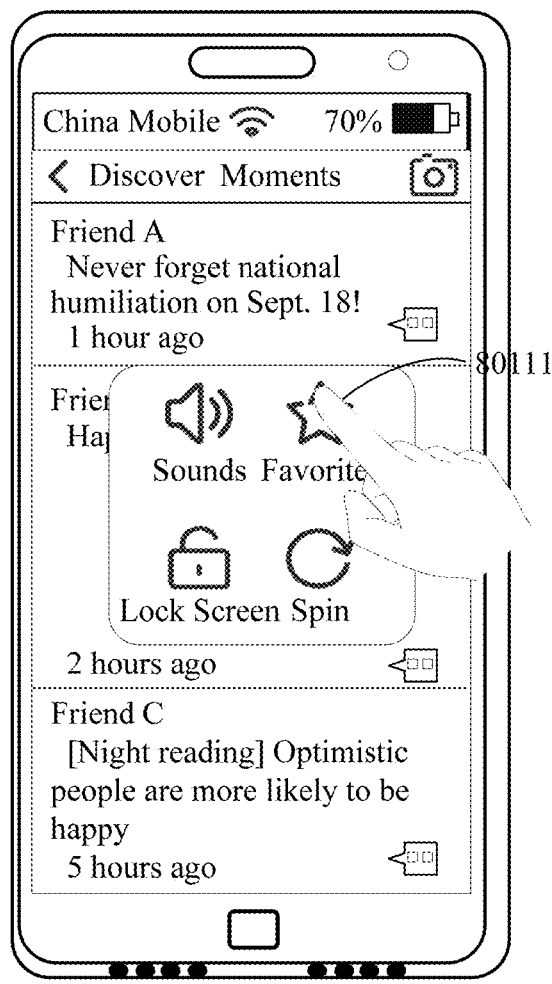
FIG. 8D is a schematic diagram of adding currently displayed activity content of a WeChat application to favorites by a terminal.

Scenario 5: The terminal currently displays the activity content in the application; and the terminal responds to an operation of selecting a favorites icon under a virtual function button by the user, to add the activity content to favorites. For example, FIG. 8A is a schematic diagram of current display of the activity content of the WeChat application on the terminal. In FIG. 8A, there is a virtual function button 801 on a display screen of the terminal. The user can tap the virtual function button 801. FIG. 8B is a schematic diagram of performing a starting operation on the virtual function button by the user. After the user performs the operation shown in FIG. 8B, an activity is displayed, as shown in FIG. 8C. FIG. 8C is a schematic diagram of display of a function option under the virtual function button 801 on the terminal. As shown in FIG. 8C, function options such as "Notification center", "Device" 8011, "Home", and "Control center" may be included. After the user performs a starting operation on "Device" 8011, an activity is displayed, as shown in FIG. 8D. FIG. 8D is a schematic diagram of adding the currently displayed activity content of the WeChat application to favorites by the terminal. As shown in FIG. 8D, function icons such as "Sounds", "Favorites" 80111, "Spin", or "Lock Screen" may be included. If the user taps the "Favorites" icon 80111, the terminal responds to the operation of tapping the "Favorites" icon 80111, by the user, to add the currently displayed activity content of the WeChat application to favorites.

It should be understood that the favorites icon may be directly configured as an independent virtual function button. The user taps the virtual function button, and the terminal responds to the tap operation of the user to add the currently displayed activity content of the WeChat application to favorites.

Figure 9:
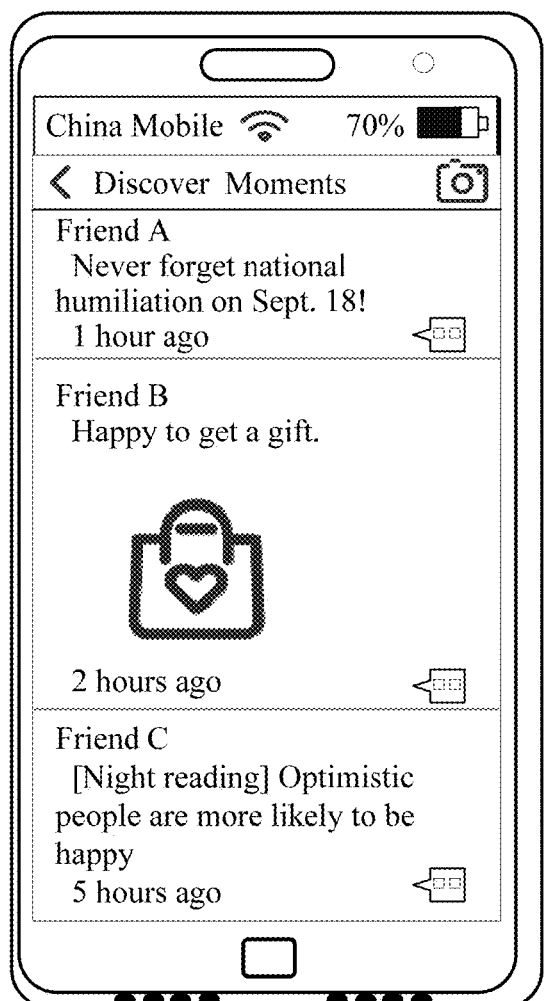
FIG. 9 is a schematic diagram of adding activity content of a WeChat application to favorites by a terminal.

Scenario 6: The terminal currently displays the activity content in the application; and the terminal receives voice entered by the user, performs matching between the voice entered by the user and preset voice, and if matching succeeds, adds the activity content to favorites. FIG. 9 is a schematic diagram of adding the activity content of the WeChat application to favorites by the terminal. In FIG. 9, when currently viewing the activity content of the WeChat application, the user can use voice to add the activity content to favorites, if other interested content is viewed, there is no sufficient time, it is inconvenient for the user to use a finger, or another scenario occurs. For example, when the user says "Favorites", "Add a current activity to favorites", or other voice 301, the terminal detects whether the voice 301 entered by the user matches the preset voice, and if the voice 301 matches the preset voice, adds currently displayed activity content of the WeChat application to favorites, or if the voice 301 does not match the preset voice, fails to add the currently displayed activity content to favorites, and provides, for the user, prompt information indicating a favorites adding failure. The user can use another favorites adding manner to add the activity content of the WeChat application to favorites.

Figure 10C:
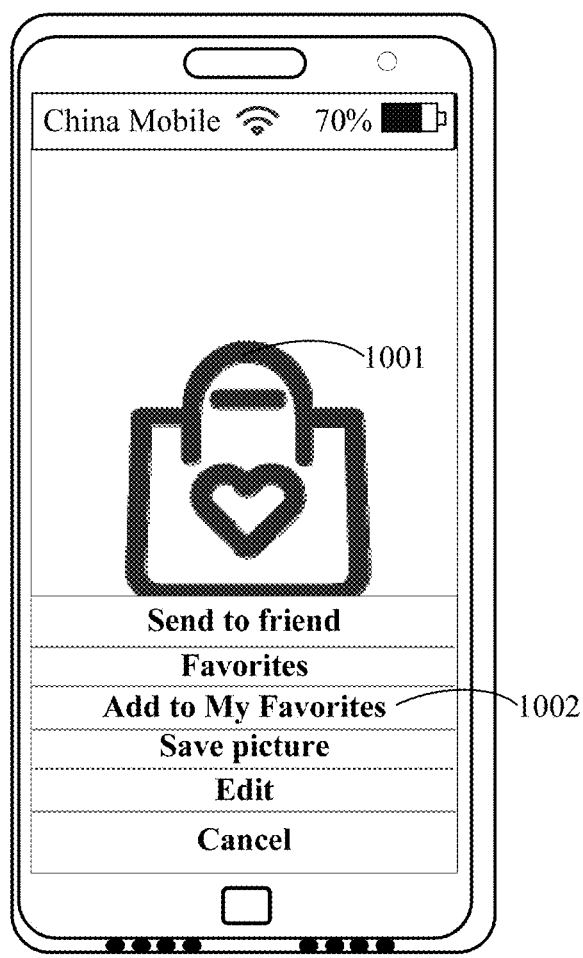
FIG. 10C is a schematic diagram of display of a function option box on a terminal.

Scenario 7: The terminal currently displays the activity content in the application; if the displayed activity content is a picture, a touch and hold operation can be performed on the picture, and a prompt box pops up; an "Add to My Favorites" icon can be selected in the prompt box; and the terminal adds the picture displayed in the activity content to favorites. FIG. 10A is a schematic diagram of currently display of Moments of the WeChat application on the terminal. In FIG. 10A, a picture 1001 is included. If the user touches and holds or taps the picture 1001, the picture can be zoomed in for display, as shown in FIG. 10B. FIG. 10B is a schematic diagram of display of the zoomed-in picture on the terminal. In FIG. 10B, a touch and hold operation or another operation can be performed on the picture 1001, and a function option box may pop up, as shown in FIG. 10C.

Figure 10D:
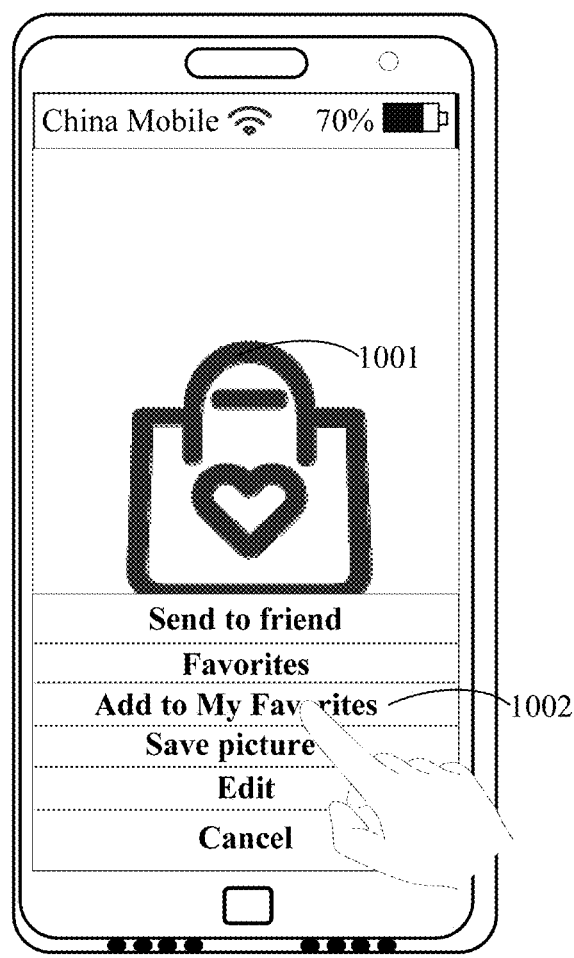
FIG. 10D is a schematic diagram of adding a picture in a WeChat application to favorites by a terminal.

FIG. 10C is a schematic diagram of display of a function option box on the terminal. In FIG. 10C, the function option box may include "Send to friend", "Favorites", "Add to My Favorites" 1002, "Save picture", "Edit", "Cancel", and the like. A selection operation is performed on "Add to My Favorites" 1002, as shown in FIG. 10D. FIG. 10D is a schematic diagram of adding the picture in the WeChat application to favorites by the terminal. Descriptions are provided in FIG. 10D by using an example of the picture in WeChat Moments. There may be two favorites adding indication options for adding the picture to favorites. One is "Favorites", to be specific, a favorites function inside the WeChat application in a broad sense. If the user taps Favorites, when the user wants to view the favorite again, the user usually starts WeChat to view the favorites function. In this case, the picture can be viewed. The other is "Add to My Favorites" 1002 described in this embodiment of this application. If the user taps "Add to My Favorites", the picture can be added to the "My Favorites" list. If the user wants to view the favorite again, the user can select a favorite object of the favorite in the "My Favorites" list, and the system automatically jumps to the WeChat application to display the picture.

It should be noted that "My Favorites" is merely used as an example for description, and may also be referred to as "System Favorites", or may be another name. "My Favorites" may alternatively be an application name, or may be a favorites list. This is not specifically limited. Assuming that "My Favorites" is an application, this application may be an application built in a terminal system, or may be an installed third-party application, and has system-level permissions. The system-level permission means that all system resources can be used. Descriptions are provided herein by using an example of an application "My Favorites".

Figure 11A:
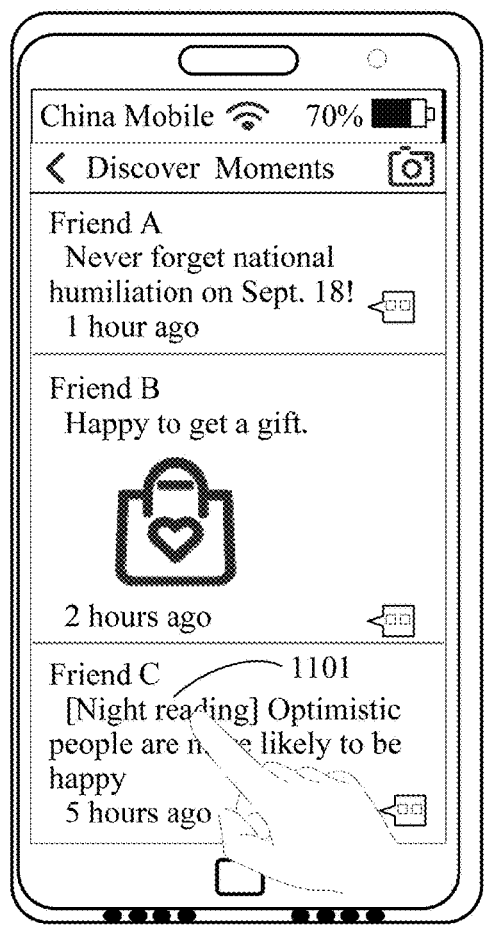
FIG. 11A is a schematic diagram of current display of Moments of a WeChat application on a terminal.
Figure 11B:
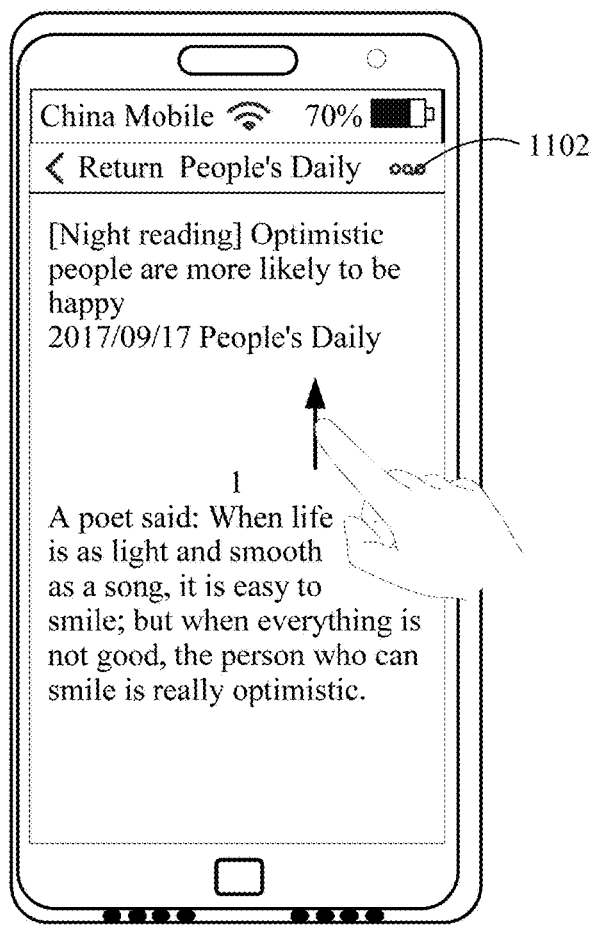
FIG. 11B is a schematic diagram of display of article content on a terminal.

Scenario 8: The terminal currently displays the activity content in the application; and if the displayed activity content is an article, a video, music, and/or the like, the user can tap a thumbnail icon, a prompt box pops up on the terminal, the user can select the option "Add to My Favorites" in the prompt box, and the terminal adds the article, the video, the music, and/or the like displayed in the activity content to favorites. FIG. 11A is a schematic diagram of current display of Moments of the WeChat application on the terminal. In FIG. 11A, an article 1101 is included. If the user taps or touches and holds the title of the article, content of this article can be displayed, as shown in FIG. 11B. FIG. 11B is a schematic diagram of display of the article content on the terminal. In FIG. 11B, there is a thumbnail icon 1102. When the user reads and finishes the article content, a slide operation can be performed to following content, as shown in FIG. 11C.

Figure 11C:
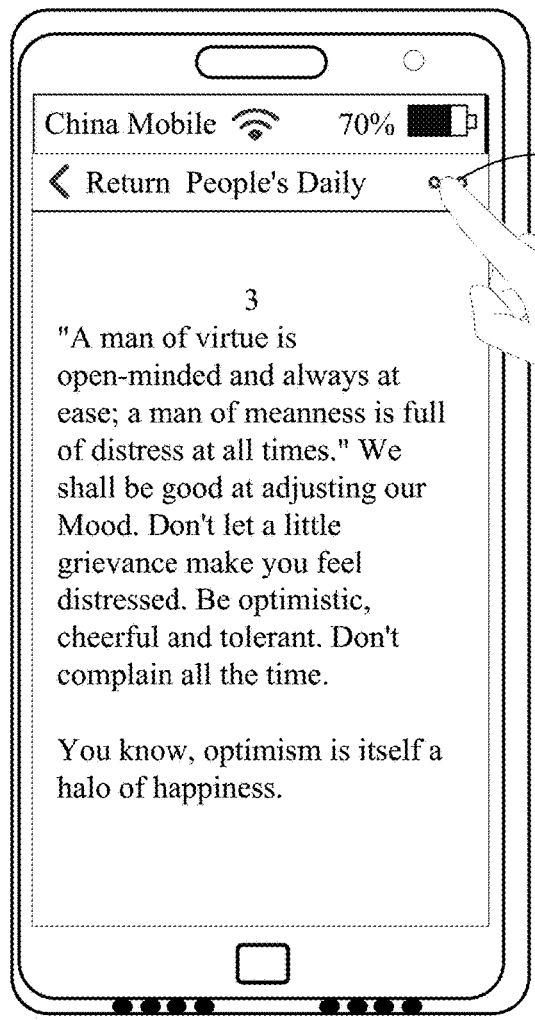
FIG. 11C is a schematic diagram of display of article content on a terminal.
Figure 11D:
FIG. 11D is a schematic diagram of adding an article in a WeChat application to favorites by a terminal.

FIG. 11C is a schematic diagram of display of article content on the terminal. In FIG. 11C, there is also the thumbnail icon 1102. If needing to add the activity content to favorites due to another reason when an interface shown in FIG. 11C is displayed during reading, the user taps the thumbnail icon 1102, and an activity shown in FIG. 11D is displayed. FIG. 11D is a schematic diagram of adding the article in the WeChat application to favorites by the terminal. That is, after the thumbnail icon 1102 is tapped, function options such as "Send to friend", "Share to Moments", "Favorites", "Add to My Favorites" 1103, "Open in browser", and "Share to QQ" that are included in FIG. 11D can be displayed. After the user selects "Add to My Favorites" 1103, the terminal adds the article currently displayed in the WeChat application to favorites.

During adding the article to favorites, there may be two favorites adding indication icons. One is "Favorites", to be specific, a favorites function inside the WeChat application in a broad sense. If the user taps the Favorites, when the user wants to view the favorite again, the user usually starts WeChat to view the favorites function. In this case, the article can be viewed. The other is "Add to My Favorites" described in this embodiment of this application. If the user taps "Add to My Favorites" 1103, the article can be added to the "My Favorites" list. If the user wants to view the favorite again, the user can tap a favorite object of the favorite in the "My Favorites" list, and the system automatically jumps to the WeChat application to display the article.

Descriptions are provided herein mainly by using an example of the article in WeChat Moments. For a video, music, or an activity, descriptions are similar to the descriptions, and no details are repeated herein.

Scenario 9: The terminal currently displays the activity content in the application, and responds to a preset operation entered by the user, to add the activity content to favorites. It should be understood that the preset operation herein may be a favorites function built in the terminal, or may be a favorites function set by the user. For example, when the user presses the volume up button and the home button simultaneously, the terminal can perform an operation of adding the activity content to favorites.

Optionally, in any one of scenario 1 to scenario 9, or another favorites adding scenario, the terminal may also add any activity content displayed in any application to favorites. After the activity content currently displayed in the application is added to favorites, a piece of prompt information indicating a favorites adding success may pop on a user interface (User Interface, UI) of the terminal. Alternatively, after successfully adding the currently displayed activity content to favorites, the terminal may jump to display an updated favorites list, and the user can perform an operation such as editing, deleting, classified management, or viewing of favorites content on the updated favorites list. If the user performs no operation on the updated favorites list, after preset duration elapses, the terminal can automatically exit from displaying of the updated favorites list.

That the terminal adds the activity content currently displayed in the application to favorites may specifically include: The terminal saves description information of the activity content, and correspondingly adds a favorite object of the activity content to the favorites list of "My Favorites". It can be understood that in an application running process, the terminal can temporarily store, in real time, the description information of the activity content currently displayed in the application. When detecting abnormal exit from the currently displayed activity content, the terminal can save the description information of the activity content. The abnormal exit mainly means that a return button or an exit button is not used for exit from the currently displayed activity content, for example, as shown in FIG. 4 or FIG. 5A and FIG. 5B. Alternatively, the terminal responds to the favorites adding operation performed by the user, and saves the description information of the currently displayed activity content, for example, as shown in FIG. 6B, FIG. 7B, FIG. 8D, FIG. 10D, or FIG. 11D. Alternatively, when detecting that the voice entered by the user matches the preset voice, the terminal can save the description information of the currently displayed activity content, for example, as shown in FIG. 9.

Optionally, the description information may include but is not limited to the following several examples:

Example 1: The description information may include application information (package name), an activity identifier (activity ID), and a content source identifier (resource ID).

Example 2: The description information may include a package name, an activity ID, and context Info. The context Info is information used to describe a context status of activity content.

Example 3: The description information may include a package name, an activity ID, a resource ID, and context Info.

Example 4: The description information may include a package name, an activity ID, a resource ID, and a timestamp. The timestamp is current time of activity content of the favorites application.

Example 5: The description information may include a package name, an activity ID, context Info, and a timestamp.

Example 6: The description information may include a package name, an activity ID, a resource ID, context Info, and a timestamp.

For example, assuming that the terminal adds activities shown in FIG. 10A, FIG. 10B, FIG. 11B, and FIG. 11C to favorites, description information in FIG. 10A is shown in the I row in Table 1, description information in FIG. 10B is shown in the II row in Table 1, description information in FIG. 11B is shown in the III row in Table 1, and description information in FIG. 11C is shown in the IV row in Table 1. Details are shown in Table 1:

TABLE 1

| Field | Package name | Activity ID | Resource ID | Context Info |
|---|---|---|---|---|
| I | com.tencent.mm | .plugin.sns.ui.EN_424b8e16 | None | 20% |
| II | com.tencent.mm | .plugin.sns.ui.SNSBrowerUI | id201219xx | None |
| III | com.tencent.mm | .plugin.webview.ui.tools.WebViewUI | fYa6UrsK01DaRDFIIHR2g | 1% |
| IV | com.tencent.mm | .plugin. webview.ui.tools.WebViewUI | fYa6UrsK01DaRDFIIHR2g | 50% |

It can be understood that as shown in Table 1, the record "None" in the resource ID or context Info herein may alternatively be marked as "0" to indicate that the information is not obtained or does not exist.

It should be noted that in the description information saved by the terminal, if the package name, the activity ID, and the resource ID are the same as those in historical description information, and the context Info or the timestamp is different from that stored in the historical description information, the terminal can automatically cover the context Info or the timestamp in the historical description information by saving the latest context Info or timestamp.

For example, when a user uses a news APP to read a piece of news, and reading is interrupted when 20% of the news is finished, the terminal adds first news activity content currently read to favorites, and saves first description information of the first news activity content. After interruption, the user may tap a favorite object in a favorites application to start the news APP and restore the content corresponding to a reading progress of 20%. The user continues to read this piece of news, and reading is interrupted again when 70% of the news is read, the terminal automatically adds second news activity content currently read to favorites, and saves second description information of the second news activity content. However, both interruptions occur within the news APP when a same article is being read. Therefore, if both the first description information and the second description information include a package name, an activity ID, a resource ID, and context Info, the package name, the activity ID, and the resource ID in the first description information are respectively the same as those in the second description information, and only the context Info in the first description information is different from that in the second description information. The context Info in the first description information is 20%, and the context Info in the second description information is 70%. In this case, the second description information can cover the first description information.

Further, a manner for obtaining context Info by the terminal may include but is not limited to the following implementations:

Implementation 1: The terminal automatically monitors a scroll-bar state of the currently displayed activity content to determine the context Info.

Implementation 2: Status attribute information is added to activity (activity) information of an application. If a system application or a third-party application on the terminal inherits the status attribution information to activity information of the application, the application can proactively transfer the status attribution information to the system.

In addition, it can be understood that data of each activity content on the terminal may be stored locally on the terminal, or may be stored on a server (for example, a cloud or a web disk). The data may be understood as permanently stored data. Only when the data of the activity content is stored, the terminal can restore, based on the description information, the activity content displayed when the activity content is added to favorites, or restore, based on the description information, the activity content displayed when the activity content is added to favorites and the context status.

Figure 21A:
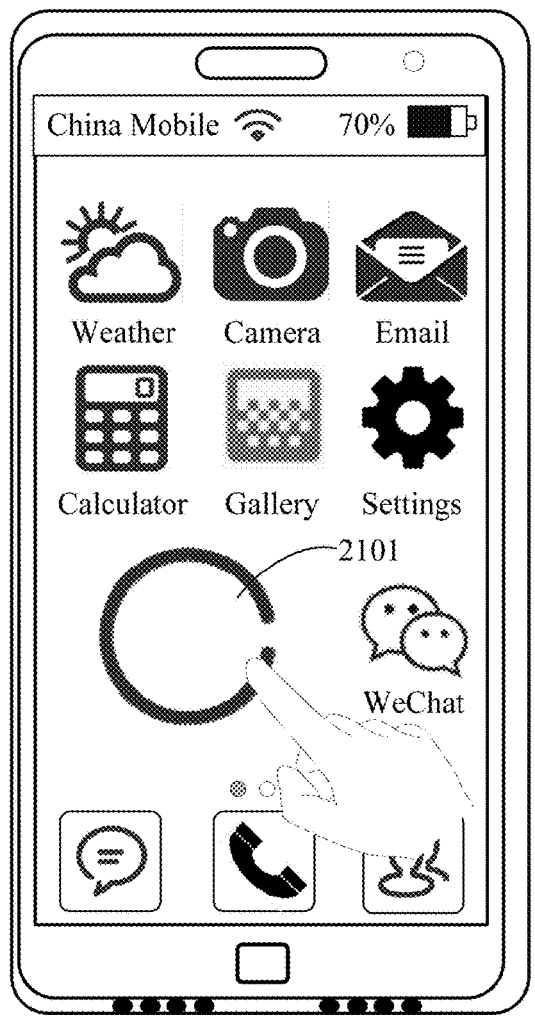
FIG. 21A is a schematic diagram of entering a particular gesture on a home interface of a terminal by a user.
Figure 21B:
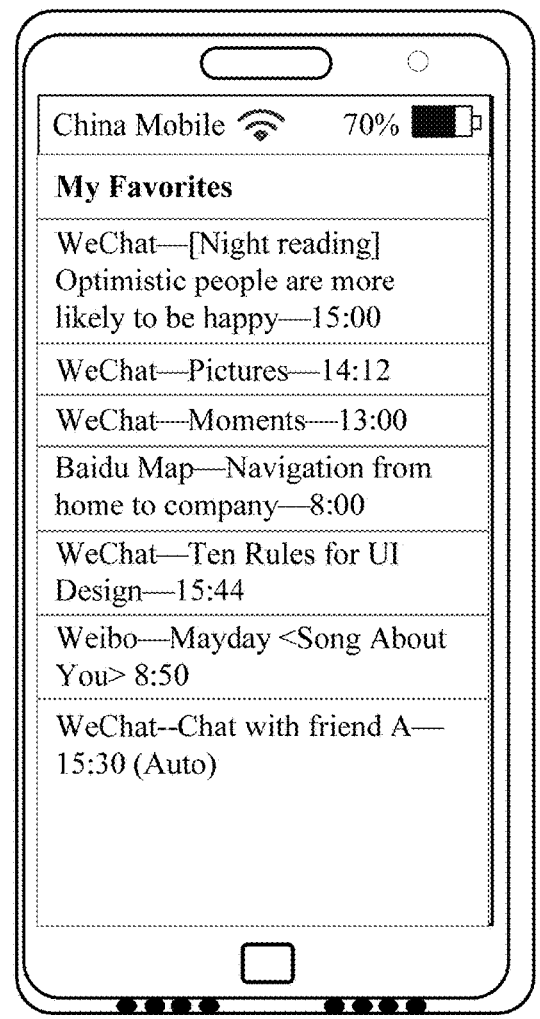
FIG. 21B is a schematic diagram of display of a favorites management interface on a terminal.

It should be noted that viewing favorite content by the user to display a user interface of the favorites management interface may include but is not limited to the following several manners:

Manner 1: When the terminal displays a home interface, if the terminal detects a particular gesture entered by the user, the terminal opens a favorites list (for example, "My Favorites"). For example, FIG. 21A is a schematic diagram of entering the particular gesture by the user on the home interface of the terminal. On the activity shown in FIG. 21A, the user can enter the particular gesture, and the terminal responds to the particular gesture entered by the user, to open the favorites list and display the favorites management interface, as shown in FIG. 21B. FIG. 21B is a schematic diagram of display of the favorites management interface on the terminal.

It should be understood that the particular gesture herein may be preset by the user or may be preset by the terminal. That is, when detecting the particular gesture entered by the user, the terminal performs an operation of opening the favorite content. The particular gesture may be a circle 2101, or may be a tick, a five-pointed star, another digit, a character, or the like. This is not specifically limited. It should be noted that the particular gesture for displaying the favorites management interface may be same as or different from the particular gesture used for adding the activity content to favorites. This is not limited herein. For example, when the terminal displays the activity content of the application, the user enters a "tick" to add the activity content to favorites. When the terminal displays the home interface, the user enters a "tick" to display the favorites management interface.

Figure 22A:
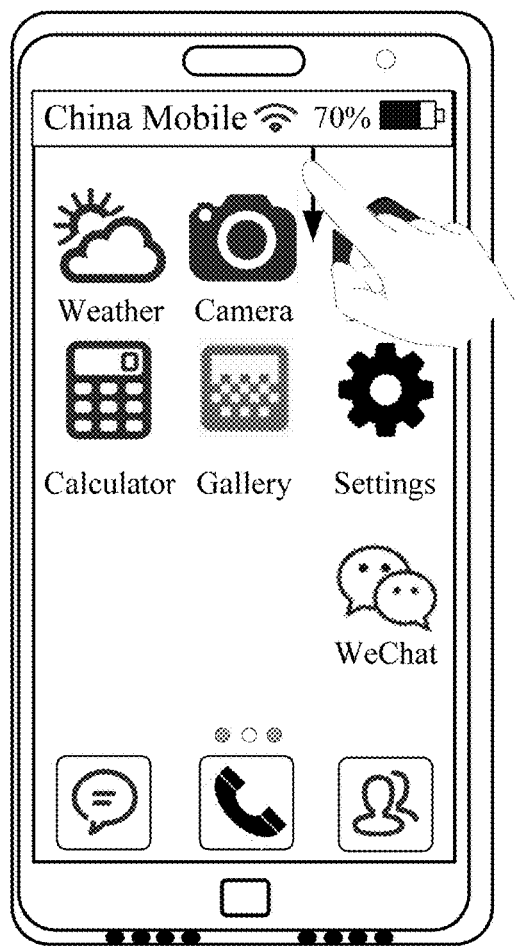
FIG. 22A is a schematic diagram of display of a home interface on a terminal.
Figure 22B:
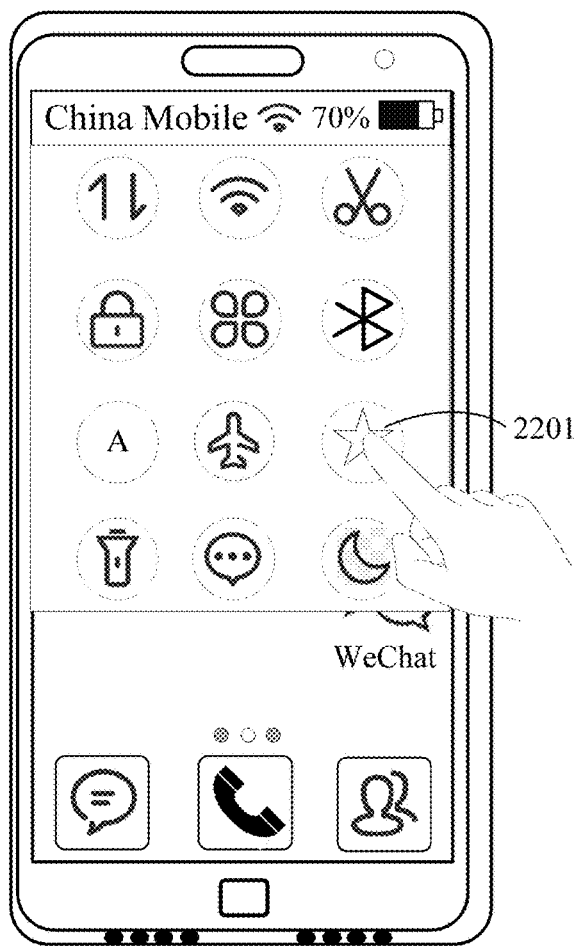
FIG. 22B is a schematic diagram of display of a function icon option in a drop-down function icon menu on a terminal.
Figure 22C:
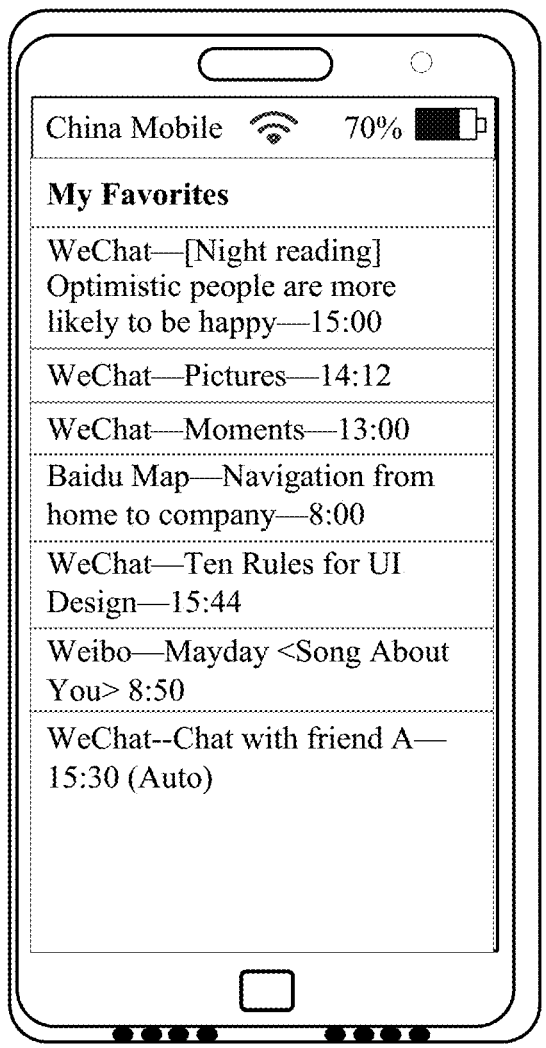
FIG. 22C is a schematic diagram of display of a favorites management interface on a terminal.

Manner 2: When the terminal displays the home interface, the terminal responds to an operation of selecting a favorites icon in the function icon menu by the user, to open the favorites list. For example, FIG. 22A is a schematic diagram of display of the home interface on the terminal. As shown in FIG. 22A, the user may perform an operation of dropping down the function icon menu, and an activity shown in FIG. 22B is displayed. FIG. 22B is a schematic diagram of display of a function icon option in the drop-down function icon menu on the terminal. In FIG. 22B, the user may perform a selection operation on the favorites icon 2201, for example, an operation such press, double-tap, touch, or slide. The terminal responds to the selection operation performed on the favorites icon 2201 by the user, to display the favorites management interface, as shown in FIG. 22C. FIG. 22C is a schematic diagram of display of the favorites management interface on the terminal.

It should be noted that the favorites icon 2201 herein in the function icon menu may be the same as or different from the favorites icon 701 used for adding the activity content to favorites. This is not limited herein. For example, the favorites icons are the same; in this case, when the terminal displays the activity content of the application, if the user performs a selection operation on the favorites icon, the activity content may be added to favorites; or when the terminal displays the home interface, if the user performs a selection operation on the favorites icon, the favorites management interface may be displayed.

Figure 23A:
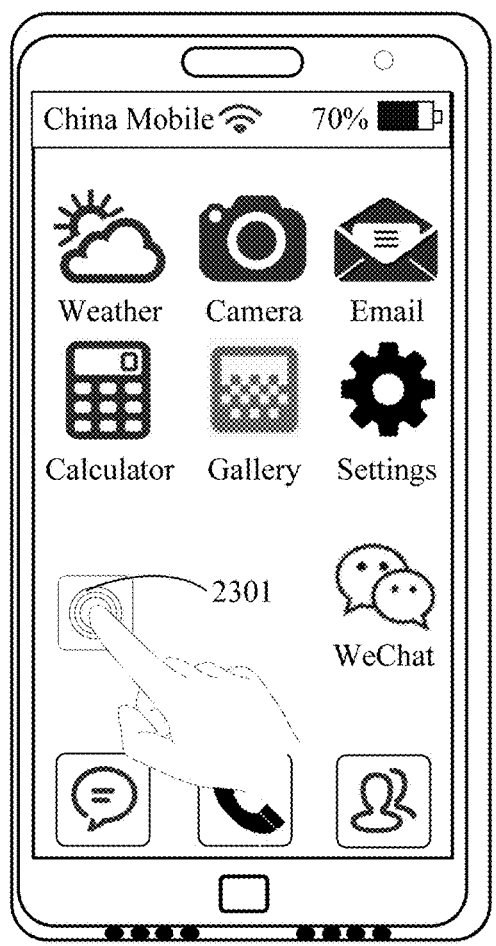
FIG. 23A is a schematic diagram of performing a starting operation on a virtual function button by a user.
Figure 23B:
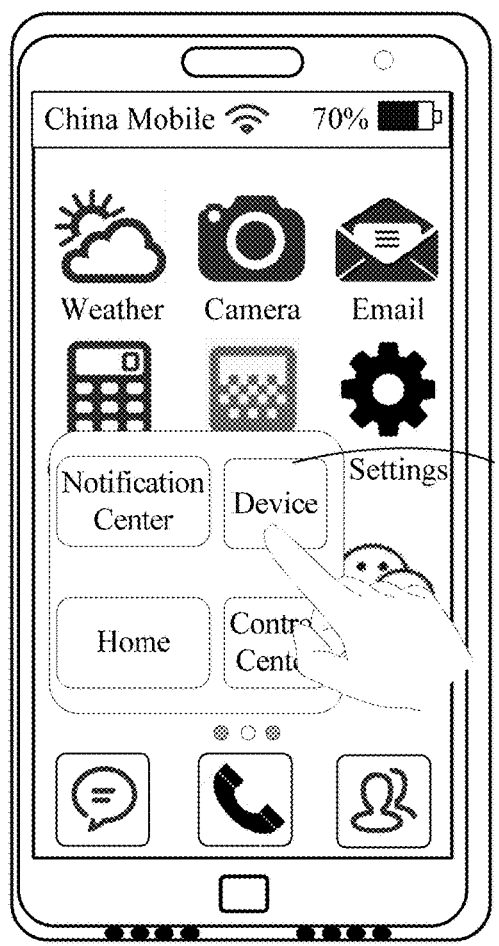
FIG. 23B is a schematic diagram of display of a function option under a virtual function button on a terminal.
Figure 23C:
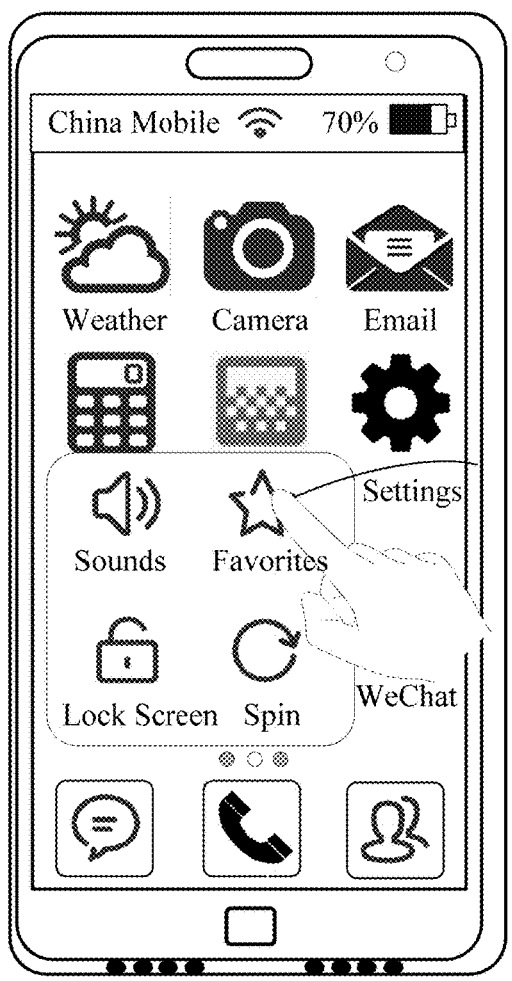
FIG. 23C is a schematic diagram of performing a selection operation on a favorites function button on a terminal.
Figure 23D:
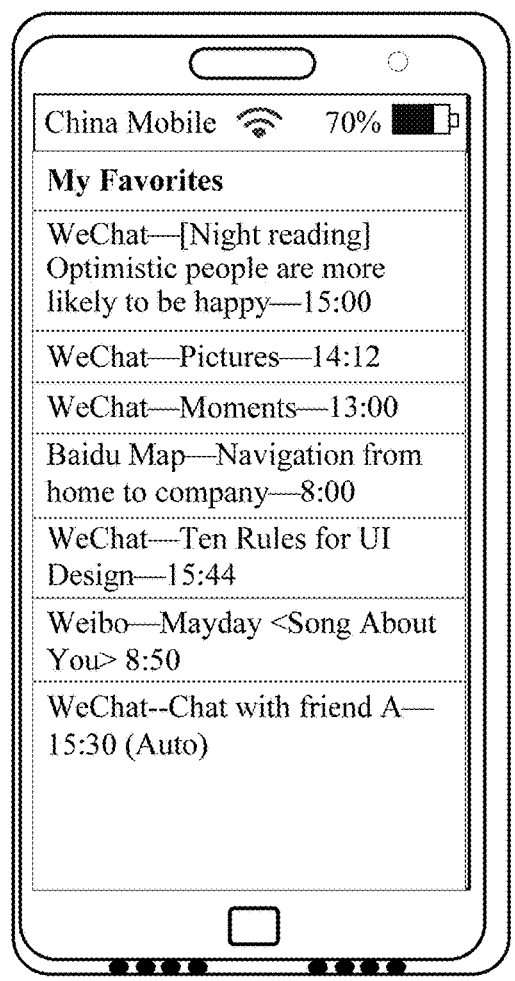
FIG. 23D is a schematic diagram of display of a favorites management interface on a terminal.

Manner 3: The terminal responds to an operation of selecting a favorites icon under a virtual function button by the user, to open the favorites list. For example, FIG. 23A is a schematic diagram of performing a starting operation on the virtual function button by the user. In FIG. 23A, when there is a virtual function button 2301 on a display screen of the terminal, the user can tap the virtual function button 2301, as shown in FIG. 23B. FIG. 23B is a schematic diagram of display of a function option under the virtual function button on the terminal. As shown in FIG. 23B, function options such as "Notification center", "Device" 23011, "Home", and "Control center" may be included. FIG. 23C shows a starting operation performed on "Device" 23011 by the user. FIG. 23C is a schematic diagram of performing a selection operation on a favorites function button on the terminal. As shown in FIG. 23C, function icons such as "Sounds", "Favorites" 230111, "Spin", or "Lock Screen" may be included. If the user taps the "Favorites" icon 230111, the terminal responds to the operation of tapping the "Favorites" icon 230111 by the user, to display the favorites management interface, as shown in FIG. 23D. FIG. 23D is a schematic diagram of display of the favorites management interface on the terminal.

It should be noted that the favorites icon 230111 herein in the function icon menu may be the same as or different from the favorites icon 80111 used for adding the activity content to favorites. This is not limited herein. For example, the favorites icons are the same; in this case, when the terminal displays the activity content of the application, if the user performs a selection operation on the favorites icon, the activity content may be added to favorites; or when the terminal displays the home interface, if the user performs a selection operation on the favorites icon, the favorites management interface may be displayed.

Manner 4: The terminal receives voice entered by the user, and performs matching between the voice and preset voice, and if matching succeeds, the terminal displays the favorites management interface. FIG. 24A is a schematic diagram of receiving, by the terminal, voice input performed by the user. In FIG. 24A, when the user says voice 2401 such as "Start System Favorites", the terminal detects whether the voice entered by the user matches the preset voice, and if matching succeeds, displays the favorites management interface, as shown in FIG. 24B. FIG. 24B is a schematic diagram of display of the favorites management interface on the terminal.

Manner 5: The terminal receives a starting operation performed on the application "My Favorites" by the user, and displays the favorites management interface.

Figure 12A:
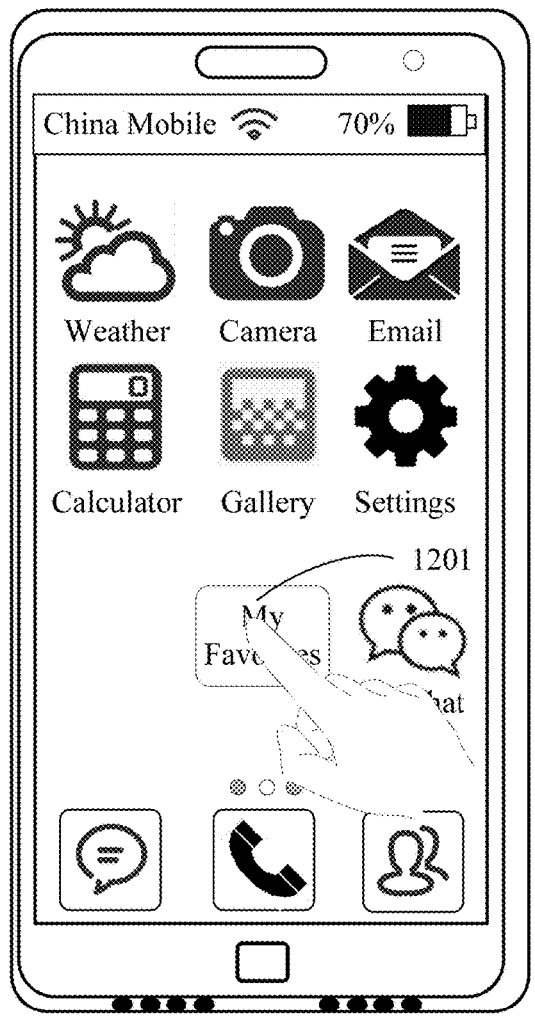
FIG. 12A is a schematic diagram of display of a favorites application on a terminal.
Figure 12B:
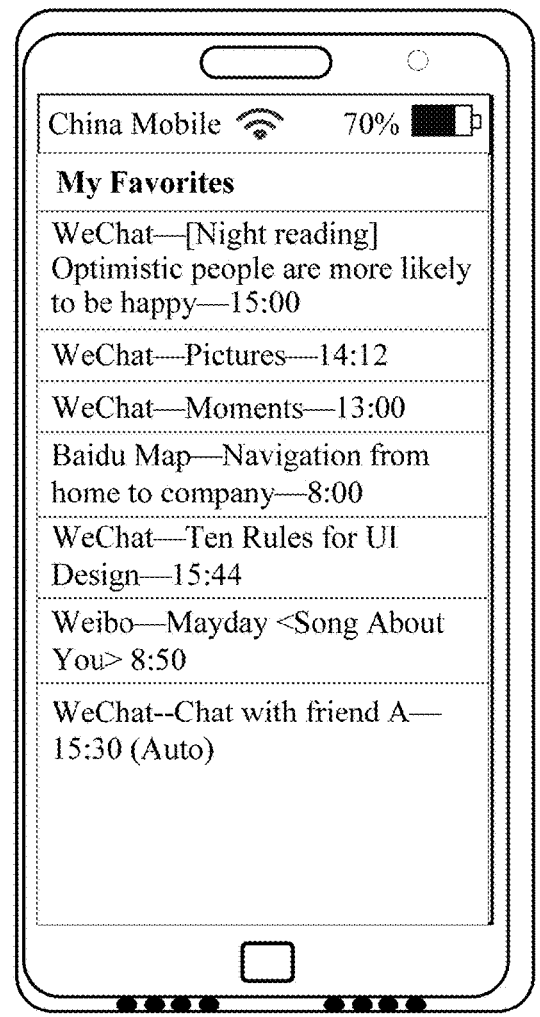
FIG. 12B is a schematic diagram of display of a favorites management interface on a terminal.

FIG. 12A is a schematic diagram of display of an application "My Favorites" on the terminal. In FIG. 12A, the user performs a starting operation on the application "My Favorites" 1201 (for example, a touch operation, a press operation, or a tap operation), and an activity shown in FIG. 12B is displayed. FIG. 12B is a schematic diagram of display of the favorites management interface on the terminal. As shown in FIG. 12B, favorite objects on the favorites management interface are: WeChat—[Night reading] Optimistic people are more likely to be happy—15:00; WeChat—Pictures—14:12; WeChat—Moments—13:00; WeChat—Ten Rules for UI Design—9:44; Weibo—Mayday <Song About You>8:50; and WeChat—Chat with friend A—8:30 (Auto). It can be understood that all favorite objects displayed in the favorites management interface may be automatically displayed according to times at which the favorite objects are added to favorites, to be specific, may be displayed in reverse chronological order or in chronological order.

Figure 25A:
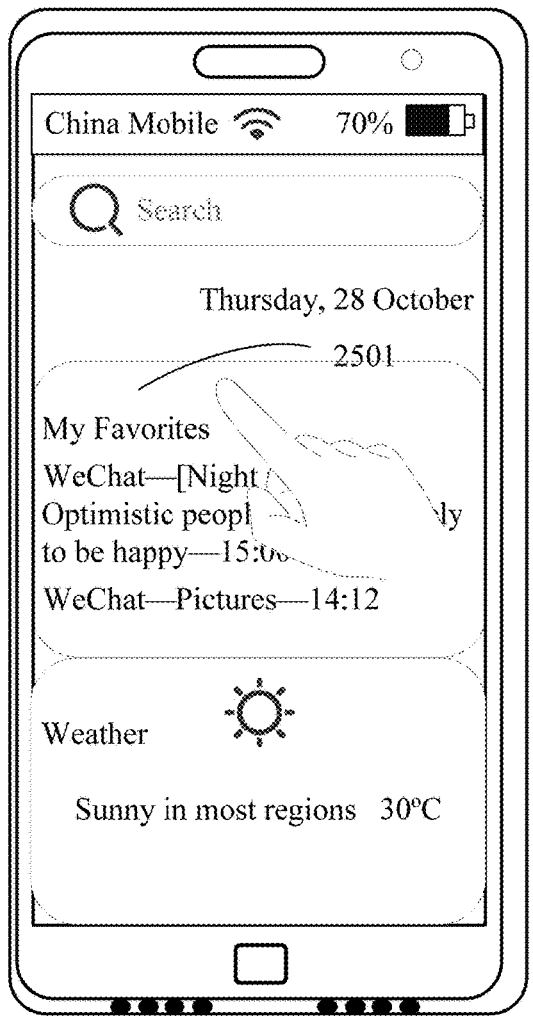
FIG. 25A is a schematic diagram of display of a plurality of widgets on a terminal.
Figure 25B:
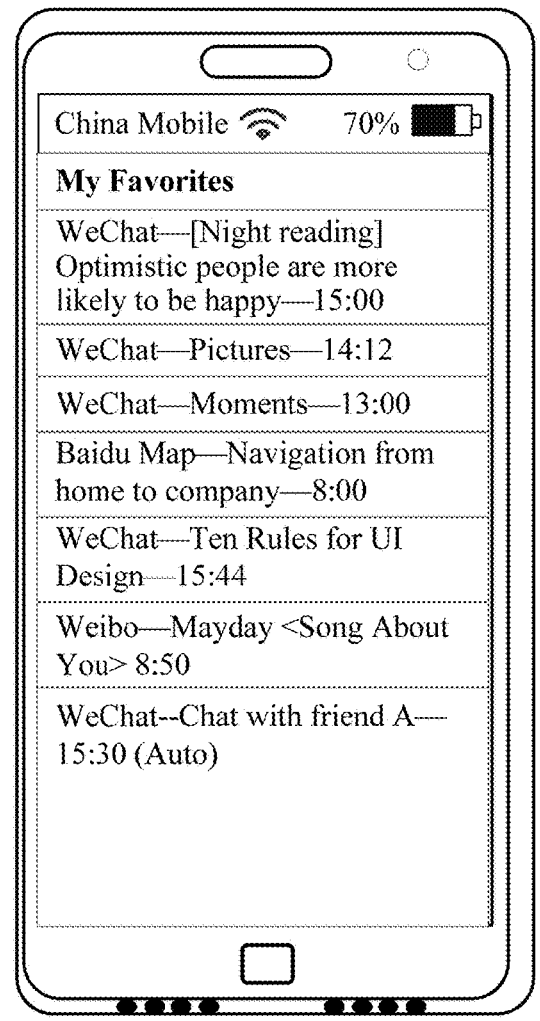
FIG. 25B is a schematic diagram of display of a favorites management interface on a terminal.

Manner 6: The terminal receives an input operation that is performed on a favorite widget by the user, and displays the favorites management interface. For example, FIG. 25A is a schematic diagram of display of a plurality of widgets on the terminal. In FIG. 25A, the user performs a starting operation (for example, a tap operation, a press operation, a double-tap operation, or a slide operation) on a favorite widget displayed on HiBoard of the terminal, and the favorites management interface is displayed, as shown in FIG. 25B. FIG. 25B is a schematic diagram of display of the favorites management interface on the terminal.

It should be noted that the foregoing several manners of displaying the favorites management interface and opening favorite content are merely several examples, or there may be another short-cut implementations. This is not specifically limited in this embodiment of this application.

It can be understood that the favorite objects displayed on the favorites management interface may be not in a one-to-one correspondence with the description information, that is, the favorite objects may be corresponding to not only the package name and the activity ID but also a timestamp. For example, a favorite object corresponding to the description information "I" in Table 1 may be "WeChat—Moments". It should be understood that assuming that there is no timestamp in the description information, a favorite object displayed in the favorites application may also include a timestamp, or a timestamp of the favorite object may be automatically added by the favorites application, for example, "WeChat—Moments—13:00".

That is, the favorite object presented on the favorites management interface may be corresponding to application information (package name) and an activity identifier (activity ID); or may be corresponding to application information (package name), an activity identifier (activity ID), and a timestamp; or may be in another presentation form. This is not specifically limited herein.

Descriptions are provided in the following by using an example in which a user interface for displaying the favorites management interface is an application "My Favorites". A user starts the application "My Favorites", and favorite objects may be displayed in a list form. Optionally, the favorite objects may be automatically managed by the terminal or may be manually managed by the user. That is, classified management may be performed automatically by the terminal based on application types of favorite objects added by the user, or may be performed by the user manually based on application types of favorite objects. Alternatively, the favorite objects may be managed based on a favorites type, for example, Manual, Auto, or Audio.

Figure 13A:
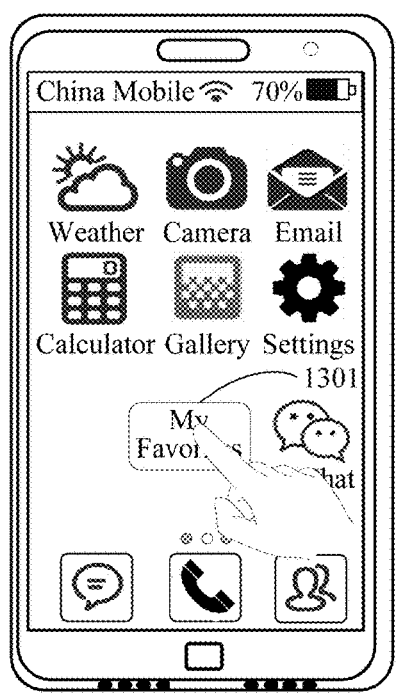
FIG. 13A is a schematic diagram of display of a favorites application on a terminal.
Figure 13B:
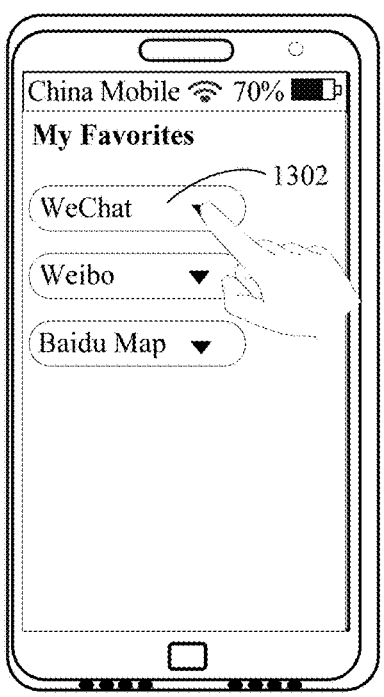
FIG. 13B is a schematic diagram of display of classified management performed based on an application type on a terminal.
Figure 13C:
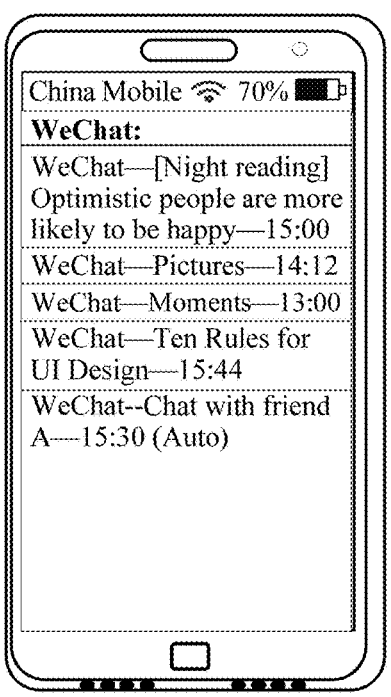
FIG. 13C is a schematic diagram of display of a favorites list about "WeChat" added to favorites on a terminal.

FIG. 13A is a schematic diagram of display of the application "My Favorites" 1301 on the terminal. Descriptions are provided herein by using automatic management as an example. When the user taps an icon of an application "My Favorites" 1301 shown in FIG. 13A, an activity is displayed, as shown in FIG. 13B. FIG. 13B is a schematic diagram of display of classified management performed based on an application type on the terminal. In FIG. 13B, classified management options displayed based on application types may include WeChat 1302, Weibo, and Baidu Map. When the user performs a selection operation on the WeChat 1302, an activity is displayed, as shown in FIG. 13C. FIG. 13C is a schematic diagram of display of a favorites list about "WeChat" added to favorites on the terminal. In FIG. 13C, the favorites list about "WeChat" includes: WeChat—[Night reading] Optimistic people are more likely to be happy—15:00; WeChat—Pictures—14:12; WeChat—Moments—13:00; WeChat—Ten Rules for UI Design—15:44; and WeChat—Chat with friend A—15:30 (Auto).

Figure 14A:
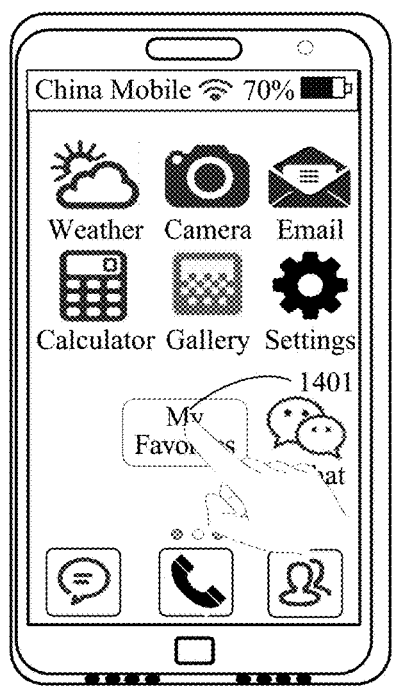
FIG. 14A is a schematic diagram of display of a favorites application on a terminal.
Figure 14B:
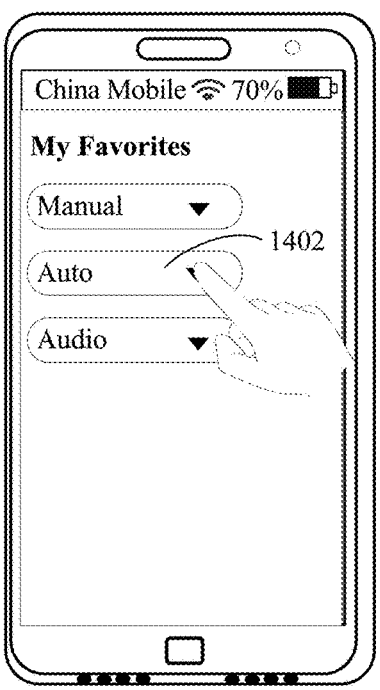
FIG. 14B is a schematic diagram of display of classified management performed based on a favorites type on a terminal.
Figure 14C:
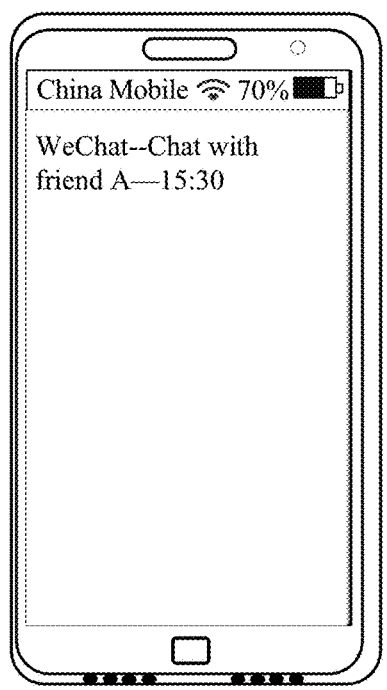
FIG. 14C is a schematic diagram of display of a favorites list under Auto added to favorites on a terminal.

FIG. 14A is a schematic diagram of display of the application "My Favorites" 1401 on the terminal. Descriptions are provided herein by using automatic management as an example. When the user taps an icon of an application "My Favorites" 1401 shown in FIG. 14A, an activity is displayed, as shown in FIG. 14B. FIG. 14B is a schematic diagram of display of classified management performed based on a favorites type on the terminal. In FIG. 14B, classified management options displayed based on favorites types may include Manual, Auto 1402, and Audio. When the user performs a selection operation on Auto 1402, an activity is displayed, as shown in FIG. 14C. FIG. 14C is a schematic diagram of display of a favorites list added to favorites under "Auto" on the terminal. In FIG. 14C, the favorites list about "Auto" includes: WeChat—Chat with friend A—15:30 (Auto).

When the user taps any favorite object shown in FIG. 12B, FIG. 13C, and FIG. 14C, the terminal responds to a selection operation performed on the favorite object on the favorites management interface by the user, to invoke the corresponding description information for the corresponding WeChat application. After receiving the description information, the corresponding WeChat application reads the description information; and then reads, based on the description information, data stored locally or stored on a server by the WeChat application of the terminal, and displays, based on the read WeChat data, the activity content displayed when the activity content is added to favorites. It can be understood that when an application runs on a first terminal, all data about the application may be saved locally on the terminal or be saved on a server.

As described above, when the terminal adds activity content of an APP to favorites, saved description information may include but is not limited to: (1) a package name, an activity ID, and a resource ID; (2) a package name, an activity ID, and context Info; (3) a package name, an activity ID, a resource ID, and context Info; or (4) a package name, an activity ID, a resource ID, and a timestamp; or (5) a package name, an activity ID, context Info, and a timestamp; or (6) a package name, an activity ID, a resource ID, context Info, and a timestamp.

The terminal can determine a corresponding application based on the package name; can determine a corresponding activity based on the activity ID; can determine corresponding activity content based on the resource ID; and can determine a context status of the activity content based on the context Info. Based on this rule, message transferring may be performed between a favorites application and an application added to favorites. The timestamp does not have a substantial effect during viewing of favorite content, but has a specified effect on management of the favorite objects on the favorites management interface. To be specific, the user may learn of a time at which content to which a favorite object points was added to favorites.

It should be noted that (1) If the foregoing description information saved by the terminal includes a package name, an activity ID, and a resource ID, when the terminal receives an operation performed on a favorite object by the user, activity content corresponding to the favorite object is displayed on the application. Descriptions are provided by using an example in which an article is added to favorites, as shown in FIG. 11C. Assuming that a user reads 50% of the article when adding the article to favorites last time, when the activity content is re-opened, the displayed activity content is activity content starting from the beginning of the article. This is because the description information saved by the terminal does not have such information: context Info.

Figure 15A:
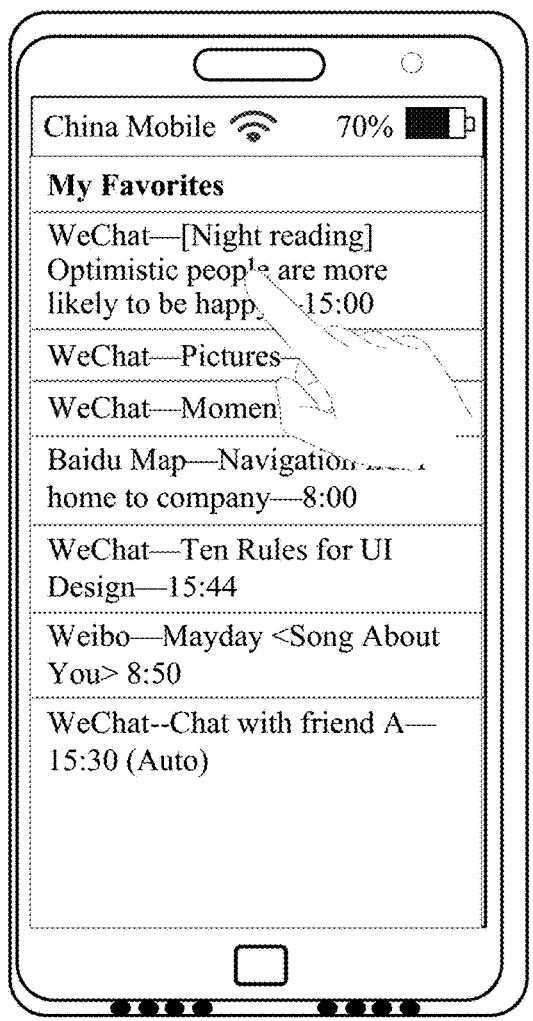
FIG. 15A is a schematic diagram of display of a favorites management interface on a terminal.
Figure 15B:
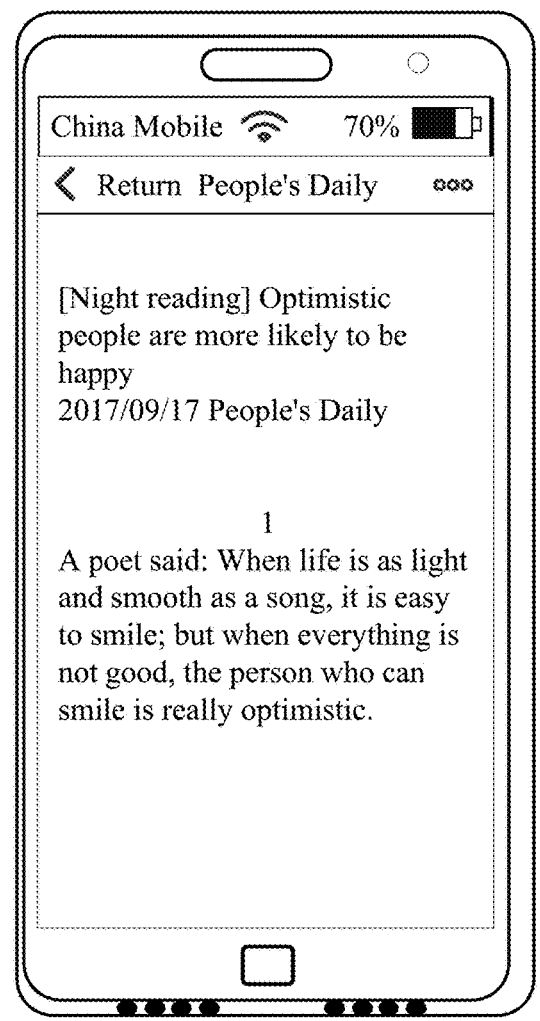
FIG. 15B is a schematic diagram of display, on a terminal, of an article displayed when the article is added to favorites previously.

For example, FIG. 15A is a schematic diagram of display of the favorites management interface on the terminal. In FIG. 15A, when the user taps the favorite object "WeChat—[Night reading] Optimistic people are more likely to be happy—15:00", the terminal can directly restore the corresponding activity content displayed when the activity content is added to favorites previously, as shown in FIG. 15B. FIG. 15B is a schematic diagram of display, on the terminal, of an article displayed when the article is added to favorites previously.

Figure 16A:
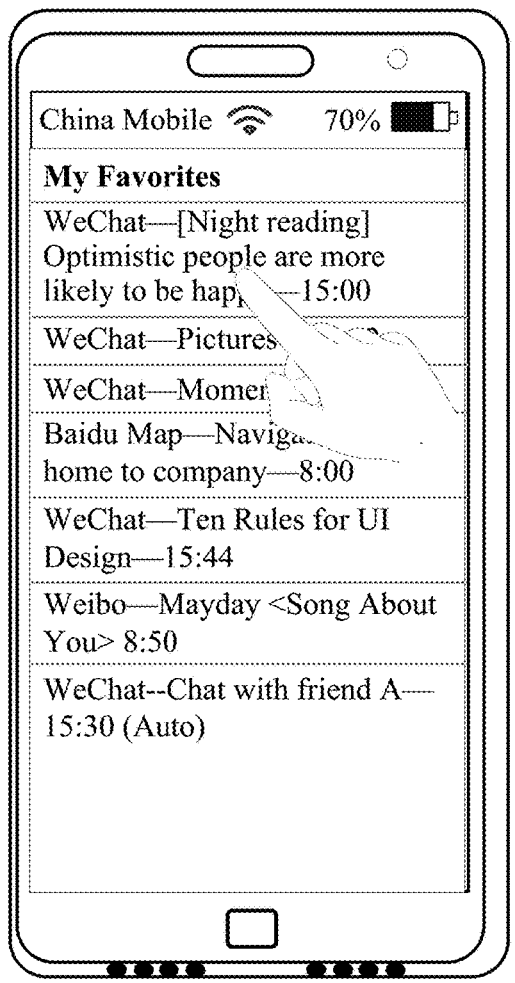
FIG. 16A is a schematic diagram of display of a favorites management interface on a terminal.
Figure 16B:
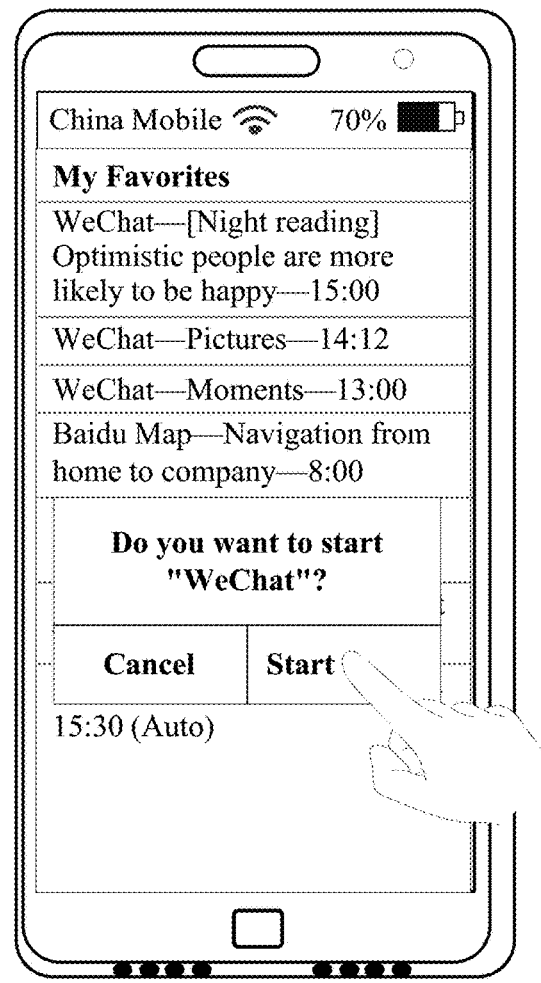
FIG. 16B is a schematic diagram of display of prompt information on a terminal.
Figure 16C:
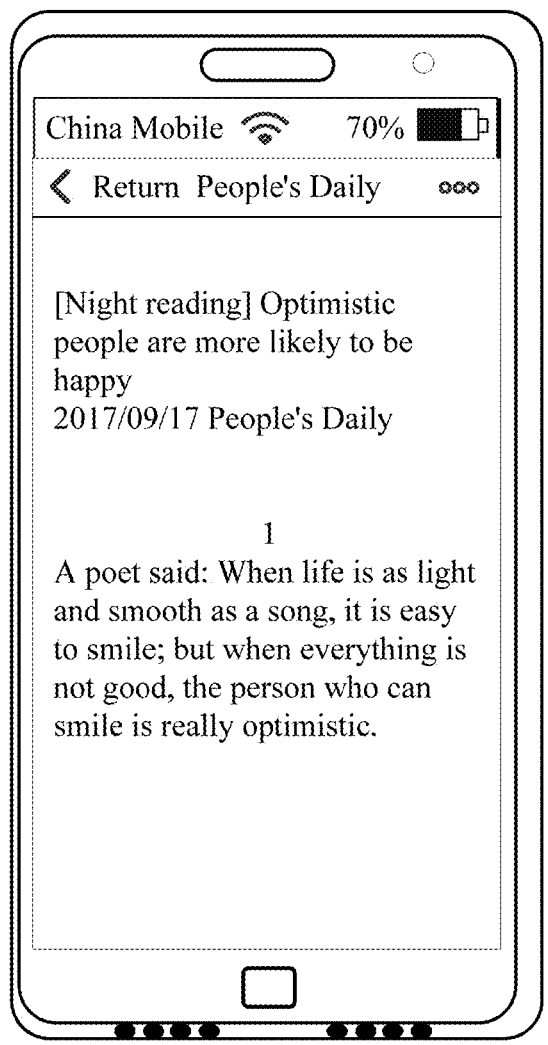
FIG. 16C is a schematic diagram of display, on a terminal, of an article displayed when the article is added to favorites previously.

FIG. 16A is a schematic diagram of display of the favorites management interface on the terminal. In FIG. 15A, when the user taps the favorite object "WeChat—[Night reading] Optimistic people are more likely to be happy—15:00", prompt information may pop up on a UI interface, as shown in FIG. 16B. FIG. 16B is a schematic diagram of display of the prompt information on the terminal. In FIG. 16B, the prompt information is used to instruct the user to start WeChat. When the user selects "Start", an activity is displayed, as shown in FIG. 16C. FIG. 16C is a schematic diagram of display, on a terminal, of an article displayed when the article is added to favorites previously.

(2) If the foregoing description information saved by the terminal includes a package name, an activity ID, a resource ID, and context Info, when receiving an operation performed on a favorite object by the user, the terminal displays, on the application, activity content corresponding to the favorite object, and restores a context status that is at a time when the activity content is added to favorites. Descriptions are provided by using an example in which an article is added to favorites, as shown in FIG. 11C. Assuming that a user reads 50% of the article when adding the article to favorites last time, when the article added to favorites is re-opened, the displayed activity content is activity content starting from 50% of the article previously read.

For example, FIG. 17A is a schematic diagram of display of the favorites management interface on the terminal. In FIG. 17A, when the user taps the favorite object "WeChat— [Night reading] Optimistic people are more likely to be happy—15:00", the terminal can directly restore the activity content displayed when the favorite object is added to favorites previously and restore the context status that is at a time when the favorite object is added to favorites, as shown in FIG. 17B. FIG. 17B is a schematic diagram of display, on the terminal, of an article displayed when the article is added to favorites previously.

Figure 18A:
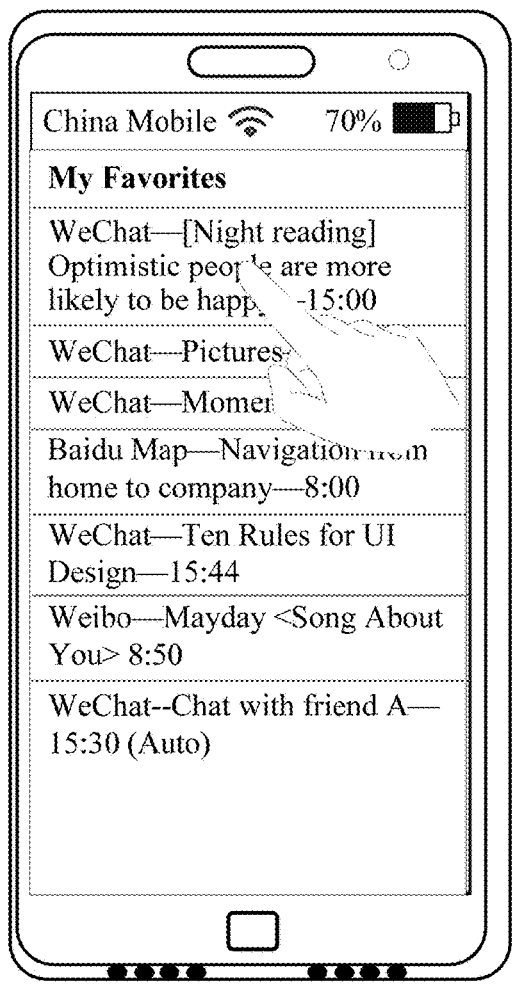
FIG. 18A is a schematic diagram of display of a favorites management interface on a terminal.
Figure 18B:
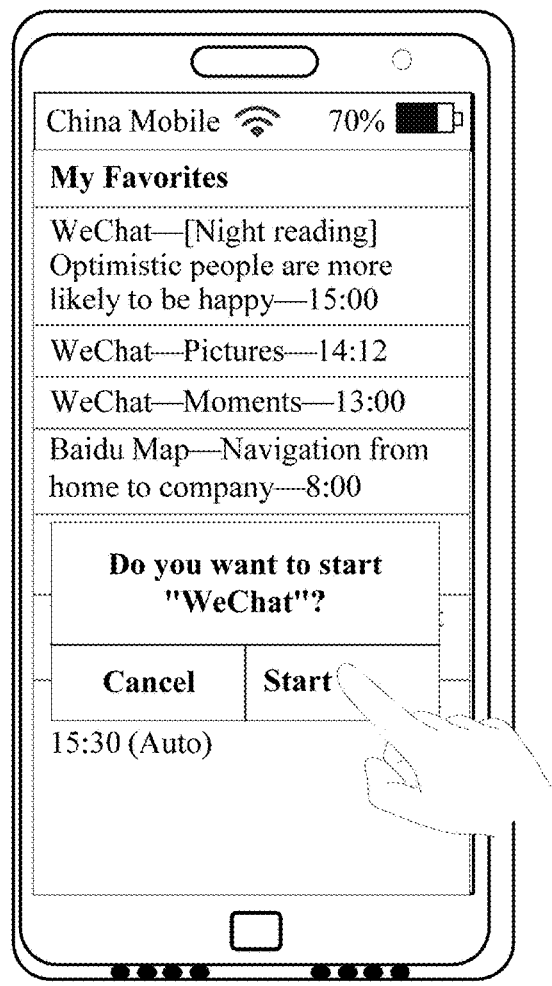
FIG. 18B is a schematic diagram of display of prompt information on a terminal.
Figure 18C:
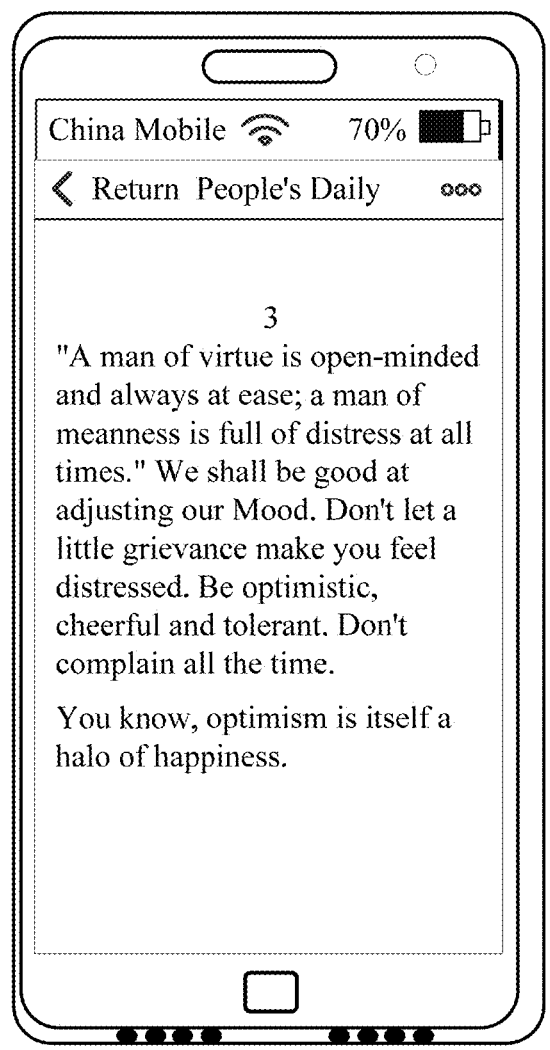
FIG. 18C is a schematic diagram of display, on a terminal, of an article and a context status that are when the article is added to favorites previously.

FIG. 18A is a schematic diagram of display of the favorites management interface on the terminal. In FIG. 18A, when the user taps the favorite object "WeChat— [Night reading] Optimistic people are more likely to be happy—15:00", prompt information may pop up on a UI interface, as shown in FIG. 18B. FIG. 18B is a schematic diagram of display of the prompt information on the terminal. In FIG. 18B, the prompt information is used to instruct the user to start WeChat. When the user selects "Start", an activity is displayed, as shown in FIG. 18C. FIG. 18C is a schematic diagram of display, on the terminal, of the article displayed when the article is added to favorites previously and the context status.

The terminal displays, on an original application, activity content added to favorites, or displays, on an original application, activity content added to favorites and restores the context status of the activity content. After the user completes viewing, the terminal may return to the favorites management interface, or may return to a default activity of the original application, or may return to the home interface, or the like. This is not specifically limited.

Figure 26A:
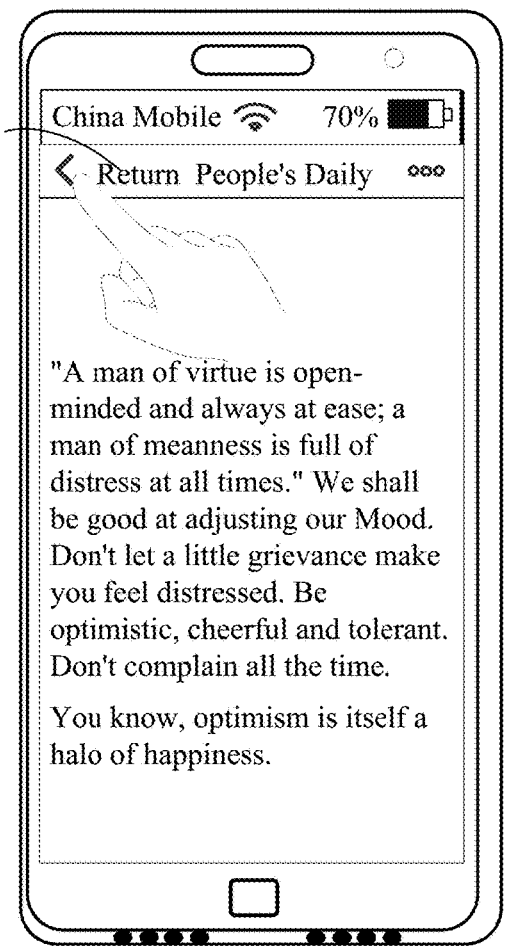
FIG. 26A is a schematic diagram of restoration and display of activity content in a WeChat application on a terminal.
Figure 26B:
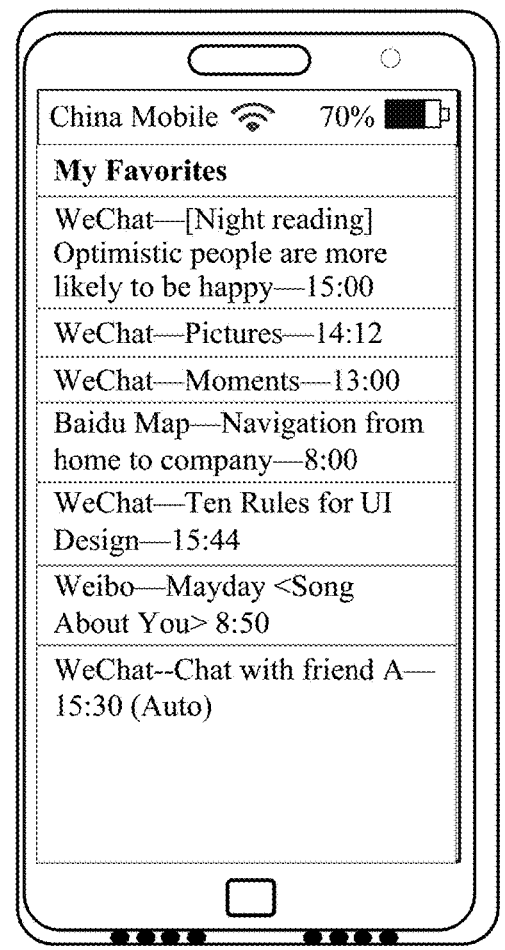
FIG. 26B is a schematic diagram of display of a returned-to activity on a terminal.

Example 1: FIG. 26A is a schematic diagram of restoration and display of the activity content in the WeChat application on the terminal. In FIG. 26A, a Return 2601 icon is included. The user may tap the Return 2601 icon after viewing the entire article, an activity is displayed, as shown in FIG. 26B. FIG. 26B is a schematic diagram of display of the returned-to activity on the terminal. In FIG. 26A, after the user taps the Return 2601 icon, the terminal may return to the favorites management interface of "My Favorites".

Figure 27A:
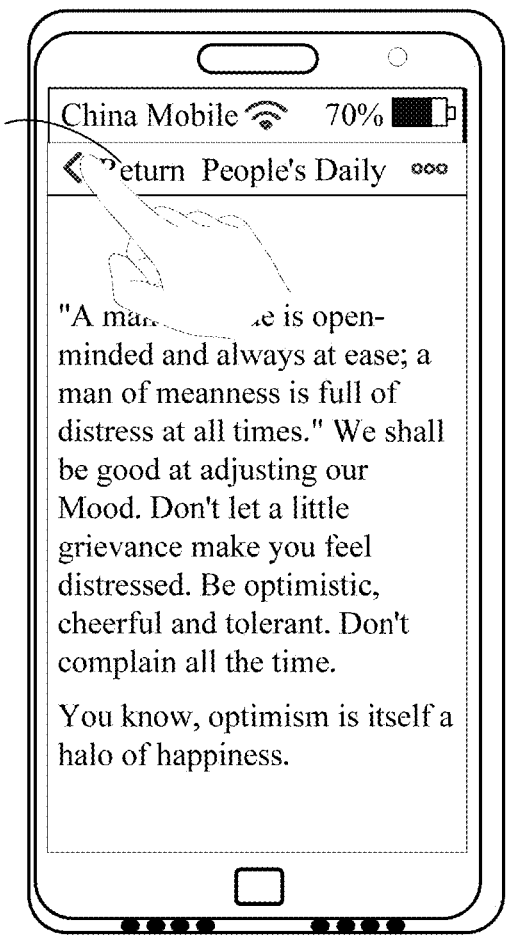
FIG. 27A is a schematic diagram of restoration and display of activity content in a WeChat application on a terminal.
Figure 27B:
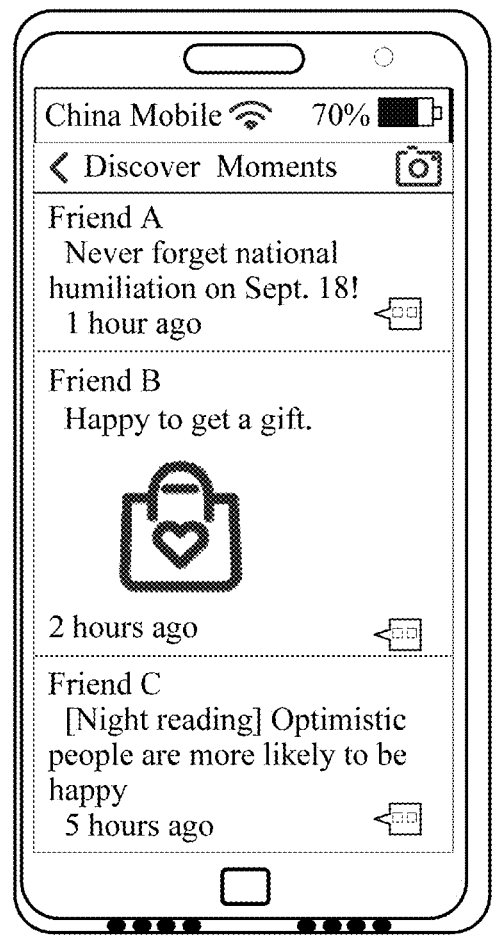
FIG. 27B is a schematic diagram of display of a returned-to activity on a terminal.

Example 2: FIG. 27A is a schematic diagram of restoration and display of the activity content in the WeChat application on the terminal. In FIG. 27A, a Return 2701 icon is included. The user may tap the Return 2701 icon after viewing the entire article, an activity is displayed, as shown in FIG. 27B. FIG. 27B is a schematic diagram of display of the returned-to activity on the terminal. In FIG. 27A, after the user taps the Return 2701 icon, the terminal may return to a Moments interface in the WeChat application.

It can be understood that after the content corresponding to the favorite object is restored in the original application and the "Return" icon is selected, the home interface may be displayed, or prompt information used to instruct to stay in WeChat or return to the favorites management interface may be displayed, or other information may be displayed. This is not limited herein.

It should be noted that when the terminal adds other activity content such as music or a video to favorites, a same restoration method is used, and a status that is at a time when the content is added to favorites on the original application can be restored. No details are repeated herein.

It should be understood that when adding activity content to favorites, the terminal saves the description information of the activity content, reducing content overheads for adding information to favorites. Alternatively, two manners may be provided: Auto and Manual. This achieves flexibility controllable by a user. In a case of viewing favorite content by a user, if description information is a package name, an activity ID, and a resource ID, when the user selects a first favorite object on a favorites management interface, the terminal may restore and display, in an application corresponding to the first favorite object, activity content displayed when the activity content is added to favorites previously; or if description information is a package name, an activity ID, a resource ID, and context Info, when the user selects a first favorite object on a favorites management interface, the terminal may display, in an application corresponding to the first favorite object, activity content displayed when the activity content is added to favorites previously, and restore a context status (which may also referred to as a usage state) that is at a time when the activity content is added to favorites; or if description information is a package name, an activity ID, and context Info, when the user selects a first favorite object on a favorites management interface, the terminal may display, in an application corresponding to the first favorite object, activity content displayed when the activity content is added to favorites previously, and restore a context status that is at a time when the activity content is added to favorites.

In this embodiment of this application, a description specification for describing activity content information is defined, where the description specification may be used for describing resource information of an activity and a context status. In this way, a favorites adding manner based on the activity content and the context status is implemented. The terminal monitors an activity running status and when used by the user, automatically adds, to favorites, activity content that has not been finished due to interruption; or the user may manually add currently displayed activity content to favorites. When the user wants to read the content again, the user can quickly open and restore the context status that is at a time when the activity content is added to favorites. Optionally, the user may add any activity of any APP to favorites. For example, any quantity of unread articles in WeChat Moments can be added to favorites. That is, a favorites function based on activity information of an original application itself is implemented, and a specification for describing the activity information is defined; According to the rule, a favorites system does not need to parse detailed information of favorite content; and the favorite content can be directly opened based on the original application, and an original running state is retained. This improves user experience.

Figure 28A:
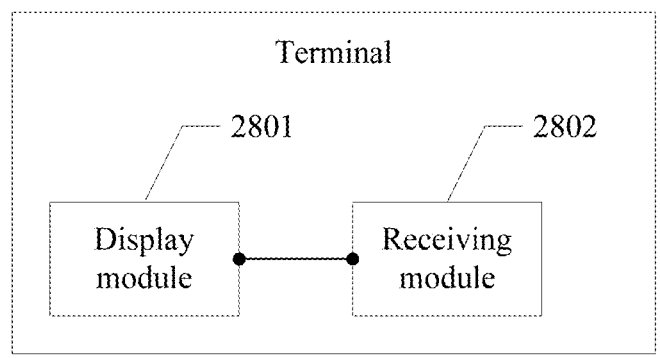
FIG. 28A is a schematic diagram of another embodiment of a terminal according to an embodiment of this application.

FIG. 28A is a schematic diagram of another embodiment of a terminal according to an embodiment of this application. The terminal includes:
  a display module 2801, configured to: display a favorites management interface, where a first favorite object and a second favorite object are displayed on the favorites management interface; if the operation points to the first favorite object, respond to the operation to display, in a first application, content corresponding to the first favorite object; or if the operation points to the second favorite object, respond to the operation to display, in a second application, content corresponding to the second favorite object; and
  a receiving module 2802, configured to receive an operation entered by a user.

Optionally, in some embodiments of this application, the first favorite object is added to favorites by using a favorites entrance provided by the first application.

Optionally, in some embodiments of this application, the first favorite object is added to favorites by using a favorites entrance provided by the terminal, and the favorites entrance provided by the terminal is different from the favorites entrance provided by the first application.

Optionally, in some embodiments of this application, the display module 2801 is further configured to: if the content corresponding to the first favorite object is displayed, restore and display a context status that is at a time when the content corresponding to the first favorite object is added to favorites.

Figure 28B:
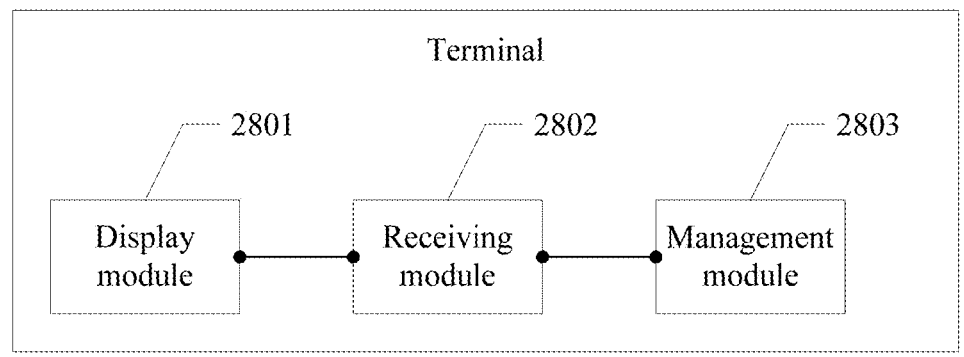
FIG. 28B is a schematic diagram of another embodiment of a terminal according to an embodiment of this application.

Optionally, in some embodiments of this application, FIG. 28B is a schematic diagram of another embodiment of a terminal according to an embodiment of this application. The terminal further includes:
  a management module 2803, configured to: perform classified management on the first favorite object and the second favorite object based on an application type; or perform classified management on the first favorite object and the second favorite object based on a favorites type.

Optionally, in some embodiments of this application, the receiving module 2802 is further configured to receive a first gesture entered by the user; and
the display module 2801 is specifically configured to: if the first gesture matches a preset gesture, display the favorites management interface.

Optionally, in some embodiments of this application, the display module 2801 is specifically configured to: receive an operation of selecting a first favorites icon from a function icon menu by the user, and display the favorites management interface.

Optionally, in some embodiments of this application, the display module 2801 is specifically configured to: receive an operation of selecting a second favorites icon under a virtual function button by the user, and display the favorites management interface.

Figure 28C:
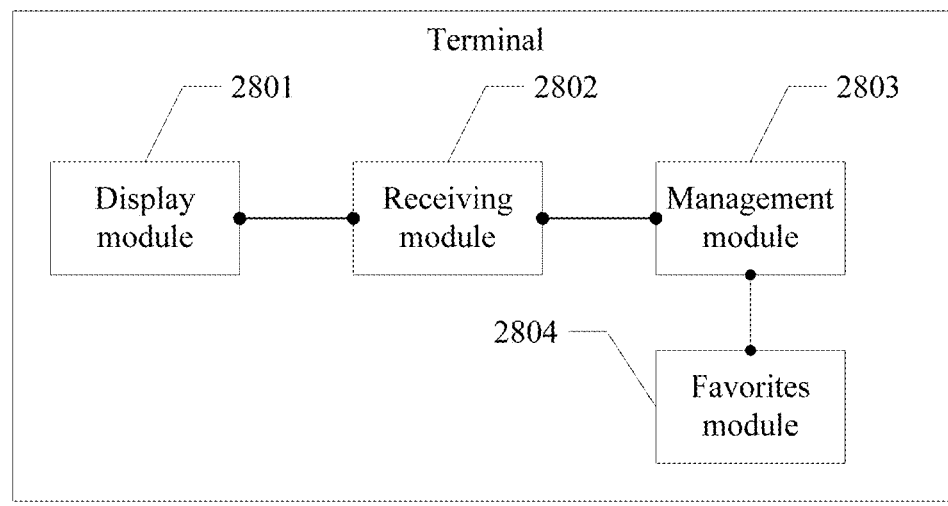
FIG. 28C is a schematic diagram of another embodiment of a terminal according to an embodiment of this application.

Optionally, in some embodiments of this application, FIG. 28C is a schematic diagram of another embodiment of a terminal according to an embodiment of this application.

The display module 2801 is further configured to currently display, in the first application, the content corresponding to the first favorite object.

The favorites module 2804 is configured to receive a favorites adding operation entered by the user, to add the content corresponding to the first favorite object to favorites.

Optionally, in some embodiments of this application, the favorites module 2804 is configured to: if the terminal detects a particular event and interrupts display of the currently displayed content corresponding to the first favorite object, add the content corresponding to the first favorite object to favorites.

Optionally, in some embodiments of this application, the favorites module 2804 is specifically configured to receive an operation of entering a second preset gesture on a display screen by the user, to add the content corresponding to the first favorite object to favorites.

Optionally, in some embodiments of this application, the favorites module 2804 is specifically configured to receive an operation of selecting a third favorites icon from the function icon menu by the user, to add the content corresponding to the first favorite object to favorites.

Optionally, in some embodiments of this application, the favorites module 2804 is specifically configured to receive an operation of selecting a fourth favorites icon under the virtual function button by the user, to add the content corresponding to the first favorite object to favorites.

Figure 28D:
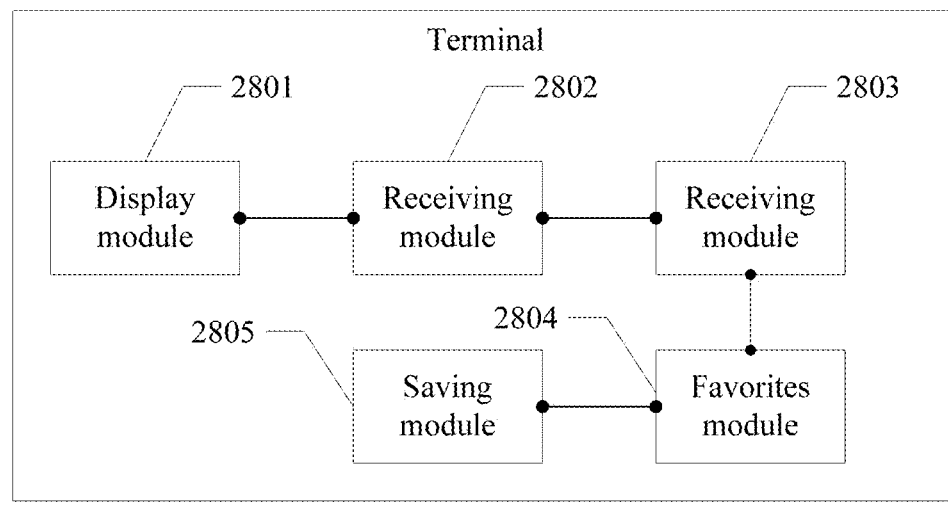
FIG. 28D is a schematic diagram of another embodiment of a terminal according to an embodiment of this application.

Optionally, in some embodiments of this application, FIG. 28D is a schematic diagram of another embodiment of a terminal according to an embodiment of this application. The terminal further includes:

a saving module 2805, configured to save description information of the content corresponding to the first favorite object, where the description information includes application information, an activity identifier, and a content source identifier; and the display module 2801 is specifically configured to: respond to the operation to obtain the description information; determine the first application based on the application information, determine, based on the activity identifier, a content activity corresponding to the first favorite object, and determine, based on the content source identifier, the content corresponding to the first favorite object; and display, in the first application, the content corresponding to the first favorite object.

Optionally, in some embodiments of this application, the saving module 2805 is configured to save description information of the content corresponding to the first favorite object, where the description information includes application information, an activity identifier, a content source identifier, and context status information;

the display module 2801 is specifically configured to: respond to the operation to obtain the description information; determine the first application based on the application information, determine, based on the activity identifier, a content activity corresponding to the first favorite object, determine, based on the content source identifier, the content corresponding to the first favorite object, and determine, based on the context status information, the context status of the content corresponding to the first favorite object; and display, in the first application, the content corresponding to the first favorite object.

Optionally, in some embodiments of this application, the saving module 2805 is configured to save description information of the content corresponding to the first favorite object, where the description information includes application information, an activity identifier, and context status information; and the display module 2801 is specifically configured to: respond to the operation to obtain the description information; determine the first application based on the application information, determine, based on the activity identifier, a content activity corresponding to the first favorite object, and determine, based on the context status information, a context status of the activity content corresponding to the first favorite object; and display, in the first application, the content corresponding to the first favorite object.

An embodiment of this application further provides a graphical user interface (Graphical User Interfaces, GUI). The graphical user interface is stored in a terminal. The terminal includes a display screen, one or more memories, and one or more processors. The one or more processors are configured to execute one or more computer programs stored in the one or more memories. The graphical user interface may include:

displaying a favorites management interface, where a first favorite object and a second favorite object are displayed on the favorites management interface;

responding to the operation on the first favorite object entered by the user, to display, in a first application, content corresponding to the first favorite object; or responding to the operation on the second favorite object entered by the user, to display, in a second application, content corresponding to the second favorite object.

Optionally, in some embodiments of this application, the graphical user interface may further include:

if the content corresponding to the first favorite object is displayed, restoring and displaying a context status that is at a time when the content corresponding to the first favorite object is added to favorites.

Optionally, in some embodiments of this application, the graphical user interface specifically includes:

if the first gesture matches a preset gesture, displaying the favorites management interface.

Optionally, in some embodiments of this application, the graphical user interface specifically includes:

receiving an operation of selecting a first favorites icon from a function icon menu by the user, and displaying the favorites management interface.

Optionally, in some embodiments of this application, the graphical user interface specifically includes:

receiving an operation of selecting a second favorites icon under a virtual function button by the user, and displaying the favorites management interface.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, all or some of the procedures or functions described in the embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hardware disk, or a magnetic tape), an optical medium (for example, DVD), a semiconductor medium (for example, a solid state disk Solid State Disk (SSD)), or the like.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders different from the order illustrated or described herein. Moreover, the terms "include", "comprise" and any other variants are intended to cover the non-exclusive inclusion, for example, a process, method, system, product, or device that includes a list of steps or units is not necessarily limited to those units, but may include other units not expressly listed or inherent to such a process, method, system, product, or device.

The invention claimed is:

1. A method for an electronic device, comprising:
   displaying, by the electronic device, a first content in a first interface of a first application;
   in response to a first operation performed on the first interface, displaying, by the electronic device, a second interface, wherein the second interface comprises a first window, and the first window comprises a first favorite icon;
   in response to a second operation performed on the first favorite icon, adding, by the electronic device, the first content to a favorites application;
   displaying, by the electronic device, a second content in a third interface of a second application;
   in response to a third operation performed on the third interface, displaying, by the electronic device, a fourth interface which comprises a second window, wherein the second window comprises a second favorite icon;
   in response to a fourth operation performed on the second favorite icon, adding, by the electronic device, the second content to the favorites application;
   receiving, by the electronic device, a fifth operation performed on the terminal;
   in response to the fifth operation, displaying, by the electronic device, a favorites interface of the favorites application, wherein the favorites interface comprises: a first favorite object corresponding to the first content and a second favorite object corresponding to the second content;
   receiving, by the electronic device, a sixth operation on the first favorite object;
   in response to the sixth operation, displaying, by the electronic device, the first content in the first application;
   receiving, by the electronic device, a seventh operation on the second favorite object; and
   displaying, by the electronic device, the third content in the second application in response to the seventh operation.

2. The method of claim 1, wherein the first favorite object comprises a first context status which includes at least one of the following elements: a reading status state, a reading progress rate, or current display position;
   wherein the displaying, by the electronic device, of the first content in the first application comprises:
   displaying, by the electronic device, the first context status of the first content, wherein the first context status is a context status when the first content is added to the favorites application.

3. The method of claim 1, wherein the first application is different from the second application, and the type of the first application is a reading application, a communication application, a pay application, or a map application.

4. The method of claim 1, wherein the method further comprises:
   receiving, by the electronic device, an eighth operation on the first content wherein the eighth operation updates the first context status of the first content to a second context status of the first content;
   saving, by the favorites application, the second context status.

5. The method of claim 1, wherein the displaying, by the electronic device, of the favorites interface of the favorites application comprises:
   displaying, by the electronic device, a favorites interface icon corresponding to the favorites application on a home page of the electronic device;
   in response to a starting operation on the favorites interface icon, displaying, by the electronic device, the favorites interface of the favorites application.

6. The method of claim 1, wherein the displaying, by the electronic device, of the favorites interface of the favorites application comprises:
   in response to an operation of dropping down the function icon menu, displaying, by the electronic device, a function icon in the drop-down function icon menu on the terminal; and
   in response to an operation of selecting the function icon, displaying, by the electronic device, the favorites interface of the favorites application.

7. The method of claim 1, wherein the first favorite object comprises at least one of: package name, activity ID, or a timestamp.

8. The method of claim 1, wherein the first favorite object and the second favorite object are displayed in the favorites interface in chronological order according to times at which the favorite objects are added to the favorites application; or
   the first favorite object and the second favorite object are classified based on an application type; or
   the first favorite object and the second favorite object are classified based on a favorites type.

9. The method of claim 1, wherein the first operation is a long-press operation and the first window is a function option box.

10. The method of claim 1, wherein the second interface comprises a part of the first content, the first window is overlapped in the first content in the second interface.

11. The method of claim 1, wherein the first window is the collection entrance provided by the terminal, wherein the collection entrance provided by the terminal is different from the collection entrance provided by the first application.

12. The method of claim 1, wherein the favorites interface of the favorites application comprises a third favorite object, wherein the third favorite object corresponds to the third content of a third application; and wherein the method further comprises:
    receiving, by the electronic device, a ninth operation on the third favorite object; and
    displaying, by the electronic device, a sixth interface of the favorites application in response to the ninth operation, the sixth interface comprising the third content.

13. The method of claim 12, wherein the method further comprises:
    receiving, by the electronic device, a tenth operation on the sixth interface; and
    displaying, by the electronic device, the favorites interface of the favorites application in response to the tenth operation.

14. The method of claim 1, wherein the displaying, by the electronic device, a first content in a first interface of a first application comprises:
    displaying, by the electronic device, a fifth interface of the first application;
    receiving, by the electronic device, a eleventh operation on the fifth interface; and
    displaying, by the electronic device, the first content in the first interface of the first application;
    and wherein the displaying, by the electronic device, the first content in the first application comprises:

displaying, by the electronic device, a seventh interface of in the first application, the seventh interface comprising the first content;

receiving, by the electronic device, a twelfth operation on the seventh interface; and displaying, by the electronic device, the fifth interface of the first application in response to the twelfth operation.

15. The method of claim 1, wherein the first favorite object comprises at least one of the followings: application information, an activity identifier, or a content source identifier.

16. The method of claim 15, wherein the method further comprising:

receiving, by the electronic device, a tenth operation on the sixth interface; and displaying, by the electronic device, the favorites interface of the favorites application in response to the tenth operation.

17. An electronic device, comprising:

a display;

a processor; and a memory;

wherein the memory comprises instructions that when executed by the processor, cause the electronic device to perform the following steps:

displaying, by the electronic device, a first content in a first interface of a first application;

in response to a first operation performed on the first interface, displaying, by the electronic device, a second interface that comprises a first window, wherein the first window comprises a first favorite icon;

in response to a second operation performed on the first favorite icon, adding, by the electronic device, the first content to a favorites application;

displaying, by the electronic device, a second content in a third interface of a second application;

in response to a third operation performed on the third interface, displaying, by the electronic device, a fourth interface which comprises a second window, wherein the second window comprises a second favorite icon;

in response to a fourth operation performed on the second favorite icon, adding, by the electronic device, the second content to the favorites application;

receiving, by the electronic device, a fifth operation performed on the terminal;

in response to the fifth operation, displaying, by the electronic device, a favorites interface of the favorites application, wherein the favorites interface comprises: a first favorite object corresponding to the first content and a second favorite object corresponding to the second content;

receiving, by the electronic device, a sixth operation on the first favorite object;

displaying, by the electronic device, the first content in the first application in response to the sixth operation;

receiving, by the electronic device, a seventh operation on the second favorite object; and displaying, by the electronic device, the second content in response to the seventh operation.

18. The electronic device of claim 17, wherein the first favorite object comprises a first context status including at least one of the following elements: a reading status state, a reading progress rate, or current display position;

wherein the displaying, by the electronic device, of the first content in the first application comprises:

displaying, by the electronic device, the first context status of the first content, wherein the first context status is a context status when the first content is added to the favorites application.

19. The electronic device of claim 17, wherein the first application is different from the second application, and the type of the first application is a reading application, a communication application, a pay application, or a map application.

20. The electronic device of claim 17, wherein the electronic device is further configured to perform:

receiving, by the electronic device, an eighth operation on the first content wherein the eighth operation updates the first context status of the first content to a second context status of the first content;

saving, by the electronic device, the second context status.

21. The electronic device of claim 17, wherein the displaying, by the electronic device, of the favorites interface of the favorites application comprises:

displaying, by the electronic device, a favorites interface icon corresponding to the favorites application on a home page of the electronic device;

in response to a starting operation on the favorites interface icon, displaying, by the electronic device, the favorites interface of the favorites application.

22. The electronic device of claim 17, wherein the displaying, by the electronic device, of the favorites interface of a favorites application comprises:

in response to an operation of dropping down the function icon menu, displaying, by the electronic device, a function icon in the drop-down function icon menu on the terminal; or in response to an operation of selecting the function icon, displaying, by the electronic device, the favorites interface of the favorites application.

23. The electronic device of claim 17, wherein the first favorite object comprises at least one of: package name, activity ID, or a timestamp.

24. The electronic device of claim 17, wherein the first favorite object and the second favorite object are displayed in the favorites interface in a chronological order according to times at which the first and the second favorite objects are added to the favorites application; or the first favorite object and the second favorite object are classified based on an application type; or the first favorite object and the second favorite object are classified based on a favorites type.

25. The electronic device of claim 17, wherein the first operation is a long-press operation and the first window is a function option box.

26. The electronic device of claim 17, wherein the second interface comprises a part of the first content, and the first window is overlapped in the first content in the second interface.

27. The electronic device of claim 17, wherein the first window is the collection entrance provided by the terminal, and the collection entrance provided by the terminal is different from the collection entrance provided by the first application.

28. The electronic device of claim 17, wherein the favorites interface of the favorites application comprises a third favorite object, wherein the third favorite object corresponds to a third content of a third application, and wherein the instructions further cause the processor to perform;

receiving, by the electronic device, a ninth operation on the third favorite object; and displaying, by the electronic device, a sixth interface of the favorites application in response to the ninth operation, the sixth interface comprising the third content.

29. The electronic device of claim 17, wherein the displaying, by the electronic device, a first content in a first interface of a first application comprises:
- displaying, by the electronic device, a fifth interface of the first application;
- receiving, by the electronic device, a eleventh operation on the fifth interface; and
- displaying, by the electronic device, the first content in the first interface of the first application;
- wherein the displaying, by the electronic device, the first content in the first application comprises:
- displaying, by the electronic device, a seventh interface of in the first application, the seventh interface comprising the first content;
- receiving, by the electronic device, a twelfth operation on the seventh interface; and
- displaying, by the electronic device, the fifth interface of the first application in response to the twelfth operation.

30. The electronic device of claim 17, wherein the first favorite object comprises at least one of the followings: application information, an activity identifier, or a content source identifier.

* * * * *

UNITED STATES PATENT AND TRADEMARK OFFICE
CERTIFICATE OF CORRECTION

| | | |
|---|---|---|
| PATENT NO. | : 12,047,528 B2 | |
| APPLICATION NO. | : 18/165577 | |
| DATED | : July 23, 2024 | |
| INVENTOR(S) | : Zhenhua Zhu et al. | |

It is certified that error appears in the above-identified patent and that said Letters Patent is hereby corrected as shown below:

In the Claims

In Column 35, Line 2, in Claim 14, delete "in the" and insert -- the --.

In Column 37, Line 13, in Claim 29, delete "in the" and insert -- the --.

Signed and Sealed this
Seventeenth Day of September, 2024

Katherine Kelly Vidal
*Director of the United States Patent and Trademark Office*